US009646627B2

(12) United States Patent
Nakadai et al.

(10) Patent No.: US 9,646,627 B2
(45) Date of Patent: May 9, 2017

(54) SPEECH PROCESSING DEVICE, METHOD, AND PROGRAM FOR CORRECTION OF REVERBERATION

(71) Applicant: HONDA MOTOR CO., LTD., Tokyo (JP)

(72) Inventors: Kazuhiro Nakadai, Wako (JP); Keisuke Nakamura, Wako (JP); Randy Gomez, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/265,640

(22) Filed: Apr. 30, 2014

(65) Prior Publication Data

US 2015/0012269 A1 Jan. 8, 2015

(30) Foreign Application Priority Data

Jul. 8, 2013 (JP) ................................ 2013-143078

(51) Int. Cl.
*G10L 15/00* (2013.01)
*G10L 21/0208* (2013.01)
*G10L 21/0216* (2013.01)

(52) U.S. Cl.
CPC *G10L 21/0208* (2013.01); *G10L 2021/02082* (2013.01); *G10L 2021/02161* (2013.01)

(58) Field of Classification Search
CPC ........... G10L 2021/02082; G10L 15/20; G10L 2021/02161; G10L 21/0208; G10K 15/12
(Continued)

(56) References Cited

U.S. PATENT DOCUMENTS

2007/0172076 A1* 7/2007 Mori ........................ H04R 3/12 381/77
2009/0248403 A1* 10/2009 Kinoshita ................ H04R 3/04 704/219
(Continued)

FOREIGN PATENT DOCUMENTS

JP H-06-236196 A 8/1994
JP H-09-261133 A 10/1997
(Continued)

OTHER PUBLICATIONS

Japanese Office Action and its English Language translation issued in corresponding JP Application No. 2013-143078, dated Oct. 4, 2016.

*Primary Examiner* — Charlotte M Baker
(74) *Attorney, Agent, or Firm* — Squire Patton Boggs (US) LLP

(57) ABSTRACT

A speech processing device includes a distance acquisition unit configured to acquire a distance between a sound collection unit configured to record speech from a sound source and the sound source, a reverberation characteristic estimation unit configured to estimate a reverberation characteristic based on the distance acquired by the distance acquisition unit, a correction data generation unit configured to generate correction data indicating a contribution of a reverberation component from the reverberation characteristic estimated by the reverberation characteristic estimation unit; and a dereverberation unit configured to remove the reverberation component from the speech by correcting the amplitude of the speech based on the correction data.

8 Claims, 15 Drawing Sheets

(58) Field of Classification Search
USPC .................................................. 704/205, 238
See application file for complete search history.

(56) References Cited

U.S. PATENT DOCUMENTS

| | | | | |
|---|---|---|---|---|
| 2009/0281804 | A1 | 11/2009 | Watanabe et al. | |
| 2010/0211382 | A1* | 8/2010 | Sugiyama | 704/205 |
| 2011/0268283 | A1* | 11/2011 | Nakadai et al. | 381/56 |
| 2013/0064042 | A1* | 3/2013 | Aarts | G01S 15/89 367/99 |
| 2013/0106997 | A1* | 5/2013 | Kim | H04N 13/0203 348/43 |
| 2014/0039888 | A1* | 2/2014 | Taubman | H04M 1/72572 704/235 |
| 2014/0122086 | A1* | 5/2014 | Kapur | A63F 13/06 704/275 |

FOREIGN PATENT DOCUMENTS

| | | | |
|---|---|---|---|
| JP | 2004-347761 | A | 12/2004 |
| JP | 2007-241304 | A | 9/2007 |
| JP | 4396449 | B | 1/2010 |
| JP | 2010-103853 | A | 5/2010 |
| JP | 2011-053062 | A | 3/2011 |
| JP | 2011-232691 | A | 11/2011 |

* cited by examiner

FIG. 9

| | Rm1 | | | | Rm2 | | | |
|---|---|---|---|---|---|---|---|---|
| METHOD | 1.0m | 1.5m | 2.0m | 2.5m | 1.0m | 1.5m | 2.0m | 2.5m |
| A | 72.3 | 5.5 | 34.3 | 19.1 | 14.2 | -1.0 | -10.0 | -22.3 |
| B | 74.1 | 63.3 | 47.0 | 35.4 | 31.6 | 17.8 | 8.0 | 1.0 |
| C | 76.1 | 69.3 | 53.4 | 44.6 | 36.0 | 24.1 | 14.5 | 5.7 |
| D | 77.2 | 71.0 | 55.9 | 47.7 | 39.3 | 28.2 | 19.8 | 11.5 |
| E | 77.5 | 71.4 | 56.2 | 47.9 | 39.5 | 28.4 | 19.9 | 11.8 |
| F | 79.0 | 74.1 | 60.5 | 54.0 | 46.2 | 38.3 | 34.8 | 27.1 |
| G | 79.6 | 74.9 | 61.3 | 55.2 | 46.8 | 39.1 | 35.7 | 28.2 |

FIG. 17

| | Rm1 | | | Rm2 | | |
|---|---|---|---|---|---|---|
| MIXTURE NUMBER | Loc1 | Loc2 | Loc3 | Loc1 | Loc2 | Loc3 |
| 2 | 10 | 8 | 9 | 3 | 1 | 2 |
| 4 | 18 | 15 | 19 | 5 | 4 | 5 |
| 8 | 29 | 27 | 27 | 12 | 15 | 14 |
| 16 | 40 | 42 | 40 | 24 | 26 | 25 |
| 32 | 57 | 55 | 59 | 37 | 40 | 38 |
| 64 | 79 | 80 | 76 | 52 | 57 | 55 |
| 128 | 90 | 91 | 88 | 68 | 71 | 70 |
| 256 | 98 | 95 | 97 | 80 | 83 | 81 |
| 512 | 98 | 96 | 97 | 81 | 84 | 81 |

SPEECH PROCESSING DEVICE, METHOD, AND PROGRAM FOR CORRECTION OF REVERBERATION

CROSS REFERENCE TO RELATED APPLICATIONS

Priority is claimed on Japanese Patent Application No. 2013-143078, filed on Jul. 8, 2013, the contents of which are entirely incorporated herein by reference.

BACKGROUND OF THE INVENTION

Field of the Invention

The present invention relates to a speech processing device, a speech processing method, and a speech processing program.

Description of Related Art

A sound emitted in a room is repeatedly reflected by walls or installed objects which cause reverberations. When reverberations are added, frequency characteristics vary from those of an original speech, and thus a speech recognition rate may decrease. In addition, since previously-uttered speech overlaps with currently-uttered speech, an articulation rate may decrease. Therefore, reverberation reducing techniques of reducing reverberation components from speech recorded under reverberation environments have been developed.

For example, Japanese Patent Publication No. 4396449 (Patent Document 1) describes a dereverbing method of acquiring a transfer function of a reverberation space using an impulse response of a feedback path adaptively identified by an inverse filter processing unit and reconstructing a sound source signal by dividing a reverberation speech signal by the magnitude of the transfer function. In the dereverbing method described in Patent Document 1, the impulse response of reverberations is estimated, but since the reverberation time ranges from 0.2 to 2.0 seconds which is relatively long, the computational load excessively increases and a processing delay becomes remarkable. Accordingly, application to speech recognition has not been spread.

R. Gomez and T. Kawahara, "Optimization of Dereverberation Parameters based on Likelihood of Speech Recognizer", INTERSPEECH, Speech & Language Processing, International Speech Communication Association, 2009, 1223-1226 (Non-patent Document 1) and R. Gomez and T. Kawahara, "Robust Speech Recognition based on Dereverberation Parameter Optimization using Acoustic Model Likelihood", IEEE Transactions on Audio, Speech & Language Processing, IEEE, 2010, 18(7), 1708-1716 (Non-patent Document 2) describe methods of calculating a correction coefficient for each frequency band based on likelihoods calculated using an acoustic model and training the acoustic model. In these methods, components of the frequency bands of speech recorded under reverberation environments are corrected using the calculated correction coefficients and speech recognition is performed using the trained acoustic model.

However, in the methods described in Non-patent Documents 1 and 2, when the positional relationship between a sound source and a sound collection unit is different from that used to determine the correction coefficients or the acoustic model, the reverberation component cannot be appropriately estimated from the recorded speech, and thus the reverberation reduction accuracy might decrease. For example, when a sound source is an utterer, a sound volume of speech recorded by the sound collection unit varies due to movement, and thus the estimation accuracy of the reverberation component might decrease.

SUMMARY OF THE INVENTION

The present invention is made in consideration of the above-mentioned circumstances and provides a speech processing device, a speech processing method, and a speech processing program which can improve reverberation reduction accuracy.

(1) In order to solve the above-mentioned problems, according to an aspect of the present invention, a speech processing device is provided including: a distance acquisition unit configured to acquire a distance between a sound collection unit configured to record a speech from a sound source and the sound source; a reverberation characteristic estimation unit configured to estimate a reverberation characteristic based on the distance acquired by the distance acquisition unit; a correction data generation unit configured to generate correction data indicating a contribution of a reverberation component from the reverberation characteristic estimated by the reverberation characteristic estimation unit; and a dereverberation unit configured to remove the reverberation component from the speech by correcting the amplitude of the speech based on the correction data.

(2) In the speech processing device according to (1), the reverberation characteristic estimation unit may be configured to estimate the reverberation characteristic including a component which is inversely proportional to the distance acquired by the distance acquisition unit.

(3) In the speech processing device according to (2), the reverberation characteristic estimation unit may be configured to estimate the reverberation characteristic using a coefficient indicating a contribution of the inversely-proportional component determined based on reverberation characteristics measured in advance.

(4) In the speech processing device according to any one of (1) to (3), the correction data generation unit may be configured to generate the correction data for each predetermined frequency band, and the dereverberation unit may be configured to correct the amplitude for each frequency band using the correction data of the corresponding frequency band.

(5) In the speech processing device according to any one of (1) to (4), the distance acquisition unit may include an acoustic model trained using speech based on predetermined distances and may select a distance corresponding to the acoustic model having a highest likelihood for the speech.

(6) The speech processing device according to any one of (1) to (5) may further include: an acoustic model prediction unit configured to predict an acoustic model corresponding to the distance acquired by the distance acquisition unit from a first acoustic model trained using speech based on the predetermined distances and having a reverberation added thereto and the second acoustic model trained using speech under an environment in which a reverberation is negligible; and a speech recognition unit configured to perform a speech recognizing process using the first acoustic model and the second acoustic model.

(7) According to another aspect of the present invention, a speech processing method is provided including: a distance acquiring step of acquiring a distance between a sound collection unit configured to record a speech from a sound source and the sound source; a reverberation characteristic estimating step of estimating a reverberation characteristic based on the distance acquired in the distance acquiring step;

a correction data generating step of generating correction data indicating a contribution of a reverberation component from the reverberation characteristic estimated in the reverberation characteristic estimating step; and a dereverbing step of removing the reverberation component from the speech by correcting the amplitude of the speech based on the correction data.

(8) According to another aspect of the present invention, a non-transitory computer-readable storage medium is provided including a speech processing program causing a computer of a speech processing device to perform: a distance acquiring process of acquiring a distance between a sound collection unit configured to record a speech from a sound source and the sound source; a reverberation characteristic estimating process of estimating a reverberation characteristic based on the distance acquired in the distance acquiring process; a correction data generating process of generating correction data indicating a contribution of a reverberation component from the reverberation characteristic estimated in the reverberation characteristic estimating process; and a dereverbing process of removing the reverberation component from the speech by correcting the amplitude of the speech based on the correction data.

According to the configuration of (1), (7) or (8), since the reverberation component represented by the reverberation characteristic estimated based on the distance acquired at that time is removed from the recorded speech, it is possible to improve the reverberation reduction accuracy.

According to the configuration of (2), by assuming that the reverberation characteristic includes a direct sound component inversely proportional to the distance from the sound source to the sound collection unit, it is possible to estimate the reverberation characteristic with a small computational load without damaging the accuracy.

According to the configuration of (3), it is possible to estimate the reverberation characteristic at that time with a smaller computational load.

According to the configuration of (4), since the reverberation component is removed based on the reverberation characteristic estimated for each frequency band, it is possible to improve the reverberation reduction accuracy.

According to the configuration of (5), since the distance from the sound source to the sound collection unit can be acquired using a pre-trained acoustic model based on the acquired speech, it is possible to improve the reverberation reduction accuracy without employing hardware for acquiring the distance.

According to the configuration of (6), since an acoustic model predicted based on the acquired distance from the sound source to the sound collection unit is used for the speech recognition process, it is possible to improve the speech recognition accuracy under a reverberation environment based on the distance.

BRIEF DESCRIPTION OF THE DRAWINGS

FIG. 9 is a diagram illustrating an example of a word recognition rate for each processing method.

FIG. 17 is a diagram illustrating an example of a correct answer rate of a distance.

DETAILED DESCRIPTION OF THE INVENTION

First Embodiment

Hereinafter, a first embodiment of the present invention will be described with reference to the accompanying drawings.

Figure 1:
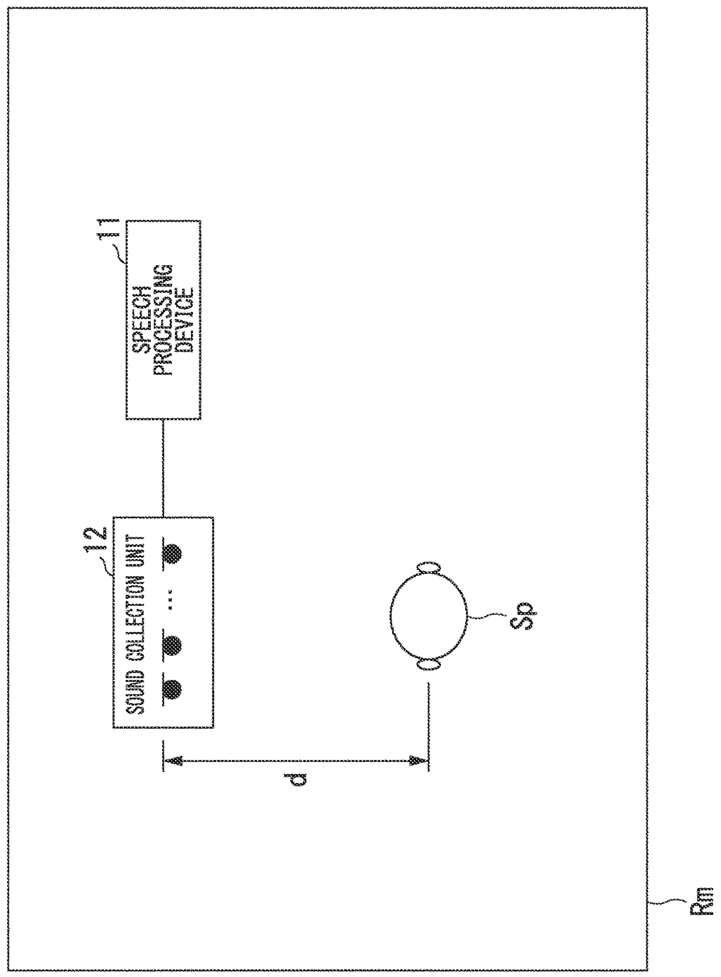
FIG. 1 is a plan view illustrating an arrangement example of a speech processing device according to a first embodiment of the present invention.

FIG. 1 is a plan view illustrating an arrangement example of a speech processing device 11 according to the first embodiment.

This arrangement example shows that a speaking person Sp is located at a position separated by a distance d from a sound collection unit 12 in a room Rm as a reverberation environment and the sound processing device 11 is connected to the sound collection unit 12. The room Rm includes inner walls reflecting an arriving sound wave. The sound collection unit 12 records a speech directly arriving from the speaking person Sp as a sound source and a speech reflected by the inner walls. The speech directly arriving from the sound source and the reflected speech are referred to as a direct sound and a reflection, respectively. A section of which the elapsed time after the direct sound is emitted is shorter than a predetermined time (for example, equal to or less than about 30 ms), the number of reflection times is relatively small, and reflection patterns are distinguished from each other in the reflection is referred to as an early reflection. A section of which the elapsed time is longer than that of the early reflection, the number of reflection times is relatively larger, and reflection patterns are not distinguished from each other in the reflection is referred to as a late reflection, a late reverberation, or simply a reverberation. In general, the time used to distinguish the early reflection and the late reflection varies depending on the size of the room Rm, but for example, a frame length as a process unit in speech recognition corresponds to the time. This is because the direct sound processed in a previous frame and the late reflection subsequent to the early reflection affect the processing of a current frame.

In general, as the sound source gets close to the sound collection unit 12 (as the distance d becomes smaller), the direct sound from the sound source occupies a larger ratio and the ratio of the reverberation becomes relatively smaller. In the description below, a speech, of which a reverberation component is small enough to neglect because the speaking person Sp is close to the sound collection unit 12, out of speech recorded by the sound collection unit 12 may be referred to as close-talking speech.

That is, the close-talking speech is an example of clean speech which is speech not including any reverberation component or including a reverberation component small enough to neglect. In contrast, speech which significantly includes a reverberation component because the speaking person Sp is spaced apart from the sound collection unit 12 may be referred to as distant-talking speech. Therefore, the term "distant" is not limited to a large distance d.

The speech processing device 11 estimates a reverberation characteristic based on the distance from the sound source to the sound collection unit 12 detected by a distance detection unit 101 (to be described later) and generates correction data indicating a contribution of a reverberation component from the estimated reverberation characteristic. The speech processing device 11 removes the reverberation component by correcting the amplitude of the recorded speech based on the generated correction data, and performs a speech recognizing process on the speech from which the reverberation component has been removed. In the description below, the reverberation characteristic means a characteristic of a combination of the later reflection and the early reflection or a characteristic of a combination of the late reflection, the early reflection, and the direct sound as well as the late reflection.

Here, the speech processing device 11 estimates the reverberation characteristic that the closer the sound source gets to the sound collection unit 12, the smaller the ratio of reverberations becomes, and removes the reverberation component using the characteristics that the ratio of the reverberation component varies depending on the frequency.

Accordingly, since the reverberation characteristic corresponding to the distance to the sound source can be estimated without sequentially measuring the reverberation characteristics, it is possible to accurately estimate a reverberation in which the estimated reverberation characteristic is added to an input speech. The speech processing device 11 can improve the reverberation reduction accuracy of a dereverbed speech obtained by removing the estimated reverberation from the input speech. In the description below, speech recorded in a reverberation environment or speech to which a reverberation component is added is collectively referred to as reverbed speech.

The sound collection unit 12 records sound signals of one or more (N, where N is an integer greater than 0) channels and transmit the recorded sound signals of N channels to the speech processing device 11. N microphones are arranged at different positions in the sound collection unit 12. The sound collection unit 12 may transmit the recorded sound signals of N channels in a wireless manner or a wired manner. When N is greater than 1, the channels have only to be synchronized with each other. The sound collection unit 12 may be fixed or may be installed in a moving object such as a vehicle, an aircraft, or a robot so as to be movable.

The configuration of the speech processing device 11 according to the first embodiment will be described below.

Figure 2:
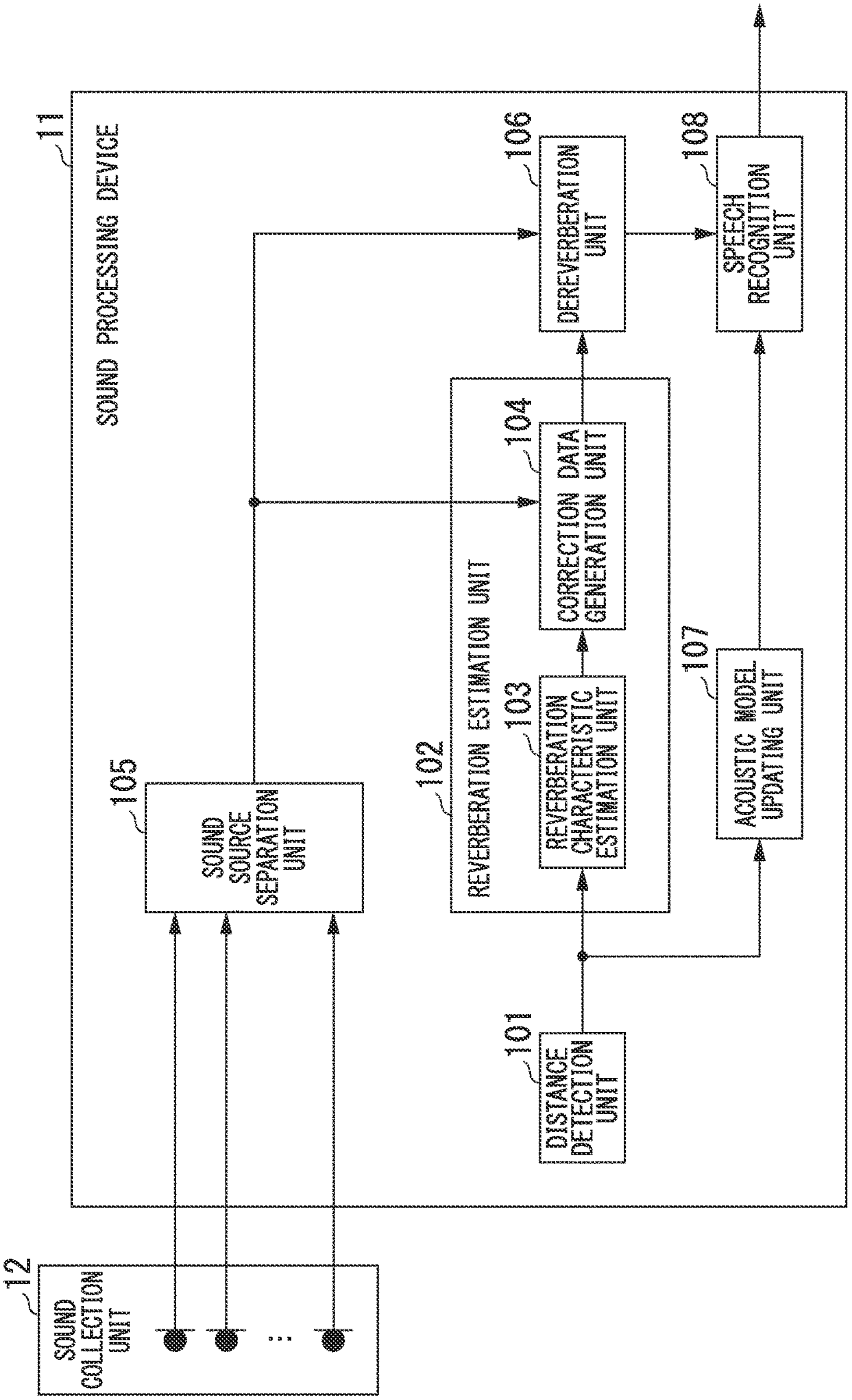
FIG. 2 is a block diagram schematically illustrating a configuration of the speech processing device according to the first embodiment.

FIG. 2 is a block diagram schematically illustrating the configuration of the speech processing device 11 according to the first embodiment.

The speech processing device 11 includes a distance detection unit (distance acquisition unit) 101, a reverberation estimation unit 102, a sound source separation unit 105, a dereverberation unit 106, an acoustic model updating unit (acoustic model prediction unit) 107, and a speech recognition unit 108.

The distance detection unit 101 detects a distance d' from a sound source to the center of the sound collection unit 12 and outputs distance data indicating the detected distance d' to the reverberation estimation unit 102 and the acoustic model updating unit 107.

In the description below, the distance d' detected by the distance detection unit 101 is distinguished from a predetermined distance d or a distance d in general description. The distance detection unit 101 includes, for example, an infrared light sensor.

In this case, the distance detection unit 101 emits infrared light as a detection signal used to detect the distance and receives a reflected wave from the sound source. The distance detection unit 101 detects a delay time between the output detection signal and the received reflected wave. The distance detection unit 101 calculates the distance to the sound source based on the detected delay time and light speed.

The distance detection unit 101 may include other detection means such as an ultrasonic sensor instead of the infrared light sensor as long as it can detect the distance to the sound source. The distance detection unit 101 may calculate the distance to the sound source based on phase differences between the channels of the sound signals input to the sound source separation unit 105 and the positions of the microphones corresponding to the channels.

The reverberation estimation unit 102 estimates the reverberation characteristic corresponding to the distance d' indicated by the distance data input from the distance detection unit 101. The reverberation estimation unit 102 generates correction data for removing (dereverbing) the estimated reverberation characteristic and outputs the generated correction data to the dereverberation unit 106. The reverberation estimation unit 102 includes a reverberation characteristic estimation unit 103 and a correction data generation unit 104.

The reverberation characteristic estimation unit 103 estimates the reverberation characteristic corresponding to the distance d' indicated by the distance data based on a predetermined reverberation model and outputs the reverberation characteristic data indicating the estimated reverberation characteristic to the correction data generation unit 104.

Here, the reverberation characteristic estimation unit 103 estimates a reverberation transfer function (RTF) $A'(\omega, d')$ corresponding to the distance d' indicated by the distance data input from the distance detection unit 101 as an index of the reverberation characteristic. The RTF is a coefficient indicating a ratio of reverberation power to power of a direct sound for each frequency $\omega$.

At the time of estimating the RTF $A'(\omega, d')$, the reverberation characteristic estimation unit 103 uses the RTF $A(\omega, d)$ measured in advance for each frequency $\omega$ with respect to a predetermined distance d. The process of estimating the reverberation characteristic will be described later.

The correction data generation unit 104 calculates a weighting parameter $\delta_{b,m}$ for each predetermined frequency band $B_m$ of each sound source based on the reverberation characteristic data input from the reverberation characteristic estimation unit 103 and the sound signal for each sound source input from the sound source separation unit 105. Here, m is an integer between 1 and M. M is an integer greater than 1 indicating a predetermined number of bands. The weighting parameter $\delta_{b,m}$ is an index indicating a contribution of power of the late reflection which is part of the reverberation to the power of the reverbed speech. The correction data generation unit 104 calculates the weighting parameter $\delta_{b,m}$ so as to minimize the difference between the power of the late reflection corrected using the weighting parameter $\delta_{b,m}$ and the power of the reverbed speech. The correction data generation unit 104 outputs the correction data indicating the calculated weighting parameter $\delta_{b,m}$ to the dereverberation unit 106. The configuration of the correction data generation unit 104 will be described later.

The sound source separation unit 105 performs a sound source separating process on the sound signals of N channels input from the sound collection unit 12 to separate the sound signals into sound signals of one or more sound sources. The sound source separation unit 105 outputs the separated sound signals of the sound sources to the correction data generation unit 104 and the dereverberation unit 106.

The sound source separation unit 105 uses, for example, geometric-constrained high order decorrelation-based source separation (GHDSS) method as the sound source separating process. The GHDSS method will be described later.

The sound source separation unit 105 may use an adaptive beam forming method of estimating a sound source direction and controlling directivity so as to maximize sensitivity in a designated sound source direction instead of the GHDSS method. The sound source separation unit 105 may use a multiple signal classification (MUSIC) method to estimate the sound source direction.

The dereverberation unit 106 separates the sound signals input from the sound source separation unit 105 into band components of the frequency bands $B_m$. The dereverberation unit 106 removes the component of the late reflection which is part of a reverberation by correcting the amplitude of the corresponding band component using the weighting parameter $\delta_{b,m}$ indicated by the correction data input from the reverberation estimation unit 102 for each separated band component. The dereverberation unit 106 combines the band components of which the amplitude is corrected for the frequency bands $B_m$ and generates a dereverbed speech signal indicating the speech (dereverbed speech) from which the reverberation is removed. The dereverberation unit 106 does not change the phases at the time of correcting the amplitudes of the input sound signals. The dereverberation unit 106 outputs the generated dereverbed speech signal to the speech recognition unit 108.

The dereverberation unit 106 calculates the amplitudes $|e(\omega, t)|$ of the dereverbed speech signals so as to satisfy, for example, Expression (1) at the time of correcting the amplitudes.

$$|e(\omega,t)|^2=|r(\omega,t)|^2-\delta_{b,m}|r(\omega,t)|^2 \text{ (if } |r(\omega,t)|^2-\delta_{b,m}|r(\omega,t)|^2 \text{ is greater than 0) } |e(\omega,t)|^2=\beta|r(\omega,t)|^2 \text{ (otherwise)} \quad (1)$$

In Expression (1), r(ω, t) represents frequency-domain coefficients obtained by transforming the sound signals into the frequency domain. By the upper part of Expression (1), the later reflection component is removed from the power of the sound signals. In the lower part of Expression (1), β is a flooring coefficient. Here, β has a predetermined positive minute value (for example, 0.05) closer to 0 than 1.

In this manner, by providing the term of $\beta|r(\omega, t)|^2$ and maintaining the least amplitude, it is difficult to detect abnormal noise.

The acoustic model updating unit 107 includes a storage unit in which an acoustic model $\lambda^{(c)}$ generated by training using close-talking speech and an acoustic model $\lambda^{(d)}$ generated by training so as to maximize a likelihood using distant-talking speech uttered at a predetermined distance d. The acoustic model updating unit 107 generates an acoustic model λ' by prediction from the two stored acoustic models $\lambda^{(c)}$ and $\lambda^{(d)}$ based on the distance d' indicated by the distance data input from the distance detection unit 101. Here, reference signs (c) and (d) represent the close-talking speech and the distant-talking speech, respectively. The prediction is a concept including both the interpolation between the acoustic models $\lambda^{(c)}$ and $\lambda^{(d)}$ and the extrapolation from the acoustic models $\lambda^{(c)}$ and $\lambda^{(d)}$. The acoustic model updating unit 107 updates the acoustic models used by the speech recognition unit 108 to the acoustic model λ' generated by itself. The process of predicting the acoustic model λ' will be described later.

The speech recognition unit 108 performs the speech recognizing process on the dereverbed speech signal input from the dereverberation unit 106 using the acoustic model λ' set by the acoustic model updating unit 107, recognizes speech details (for example, texts words and sentences), and outputs recognition data indicating the recognized speech details to the outside.

Here, the speech recognition unit 108 calculates a sound feature amount of the dereverbed speech signal for each predetermined time interval (for example, 10 ms). The sound feature amount is, for example, a combination of a static Mel-scale log spectrum (static MSLS), delta MSLS, and single delta power.

The speech recognition unit 108 recognizes phonemes from the calculated sound feature amount using the acoustic model λ' set by the acoustic model updating unit 107. The speech recognition unit 108 recognizes the speech details from a phoneme sequence including the recognized phonemes using a predetermined language model. The language model is a statistical model used to recognize a word or a sentence from the phoneme sequence.

Process of Estimating Reverberation Characteristic

A process of estimating a reverberation characteristic will be described below.

The reverberation characteristic estimation unit 103 determines the RTF A'(ω, d') corresponding to the distance d', for example, using Expressions (2) and (3).

$$A'(\omega,d')=f(d')A(\omega,d) \quad (2)$$

In Expression (2), f(d') is a gain dependent on the distance d'. f(d') is expressed by Expression (3).

$$f(d')=\alpha_1/d'+\alpha_2 \quad (3)$$

In Expression (3), $\alpha_1$ and $\alpha_2$ are a coefficient indicating a contribution of a component inversely proportional to the distance d' and a coefficient indicating a contribution of a constant component not dependent on the distance d', respectively.

Expressions (2) and (3) are based on assumptions (i) and (ii) including (i) that the phase of the RTF does not vary depending on the position of a sound source in the room Rm and (ii) that the amplitude of the RTF includes a component attenuating in inverse proportion to the distance d'.

Specifically, the reverberation characteristic estimation unit 103 determines the coefficients $\alpha_1$ and $\alpha_2$ in advance by performing the following process.

Figure 3:
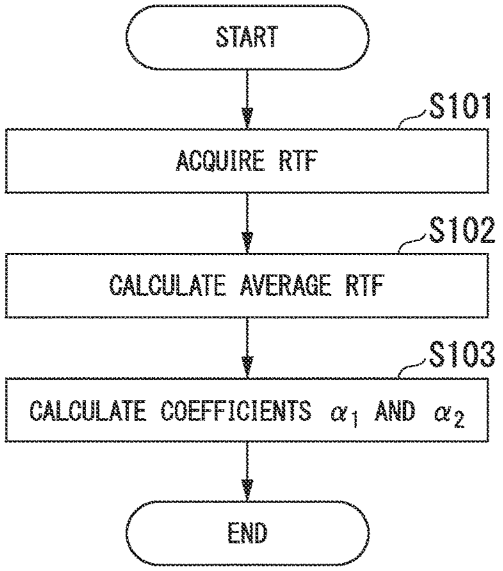
FIG. 3 is a flowchart illustrating an example of a coefficient calculating process.

FIG. 3 is a flowchart illustrating an example of a coefficient calculating process.

(Step S101) The reverberation characteristic estimation unit 103 measures $i_d$ (where $i_d$ is an integer greater than 1, for example, 3) RTFs $A(\omega, d_i)$ in advance. The distances $d_i$ (where i is an integer of 1 to $i_d$) are distances different from each other. For example, when the sound collection unit 12 includes multiple microphones and a sound based on an existing output sound signal is reproduced, the reverberation characteristic estimation unit 103 can acquire the RTFs $A(\omega, d_i)$ using the sound signals recorded by the microphones. Thereafter, the process proceeds to step S102.

(Step S102) The reverberation characteristic estimation unit 103 calculates an average RTF $\langle A(d_i)\rangle$ by averaging the acquired RTFs $A(\omega, d_i)$ in a frequency section. The reverberation characteristic estimation unit 103 uses, for example, Expression (4) to calculate the average RTF $\langle A(d_i)\rangle$.

$$\langle A(d_i)\rangle = \frac{1}{p_h - p_l + 1}\sum_{p=p_l}^{p_h} |A(\omega_p, d_i)| \qquad (4)$$

In Expression (4), | . . . | is the absolute value of . . . , p is an index (frequency bin) indicating a frequency, and $p_h$ and $p_l$ are indices indicating the highest frequency and the lowest frequency in a predetermined frequency section in which the averaging is performed.

Thereafter, the process proceeds to step S103.

(Step S103) The reverberation characteristic estimation unit 103 calculates the coefficients (fitting parameters) $\alpha_1$ and $\alpha_2$ so that the average RTF $\langle A(d_i)\rangle$ is suitable for the acoustic model expressed by Expressions (2) and (3). The reverberation characteristic estimation unit 103 uses, for example, Expression (5) to calculate the coefficients $\alpha_1$ and $\alpha_2$.

$$[\alpha_1,\alpha_2]^T=([F_y]^T[F_y])^{-1}[F_y]^T[F_x] \qquad (5)$$

In Expression (5), [ . . . ] represents a vector or a matrix and T represents the transpose of a vector or a matrix. As expressed by Expression (6), $[F_x]$ is a matrix having a vector including a reciprocal $1/d_i$ of the distance and 1 as each column. $[F_y]$ is a vector having the average RTF $\langle A(d_i)\rangle$ as each column.

$$[F_x] = \begin{bmatrix} 1/d_1 & 1 \\ \vdots & \vdots \\ 1/d_{i_d} & 1 \end{bmatrix}, [F_y] = \begin{bmatrix} \langle A(d_1)\rangle \\ \vdots \\ \langle A(d_{i_d})\rangle \end{bmatrix} \qquad (6)$$

Thereafter, the process flow illustrated in FIG. 3 is ended.

Then, the reverberation characteristic estimation unit 103 calculates a gain f(d') by substituting the coefficients $\alpha_1$ and $\alpha_2$ calculated by Expressions (5) and (6) into Expression (3) and determines the RTF A'(ω, d') corresponding to the distance d' by substituting any one of the calculated gain f(d') and the RTFs $A(\omega, d_i)$ acquired in step S101 into Expression (2).

Configuration of Correction Data Generation Unit

The configuration of the correction data generation unit 104 according to the first embodiment will be described below.

Figure 4:
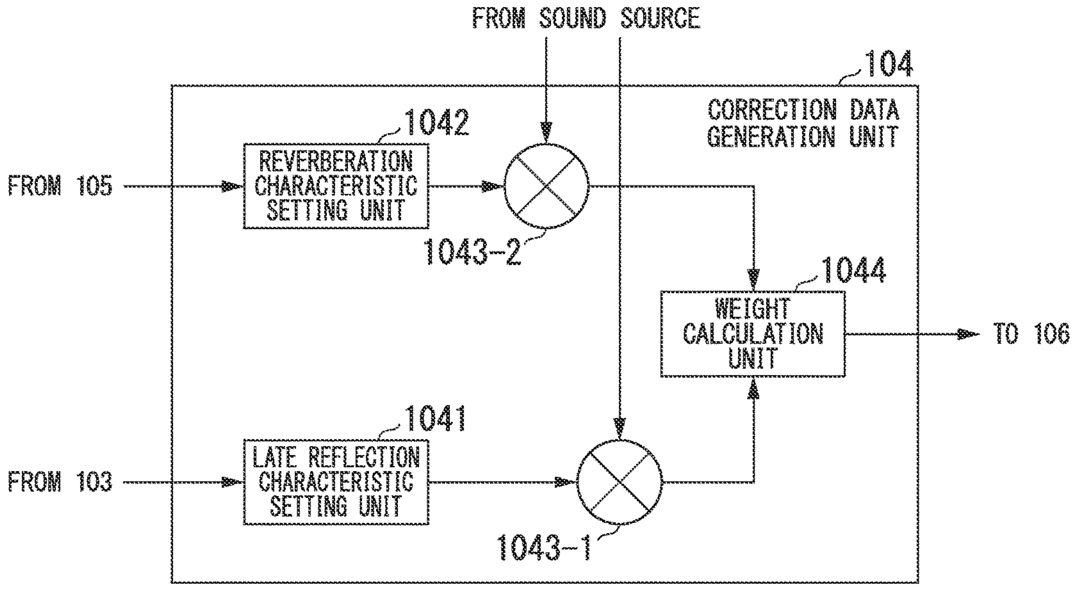
FIG. 4 is a block diagram schematically illustrating a configuration of a correction data generation unit according to the first embodiment.

FIG. 4 is a diagram schematically illustrating the configuration of the correction data generation unit 104 according to the first embodiment.

The correction data generation unit 104 includes a late reflection characteristic setting unit 1041, a reverberation characteristic setting unit 1042, two multiplier units 1043-1 and 1043-2, and a weight calculation unit 1044. Out of these elements, the late reflection characteristic setting unit 1041, the two multiplier units 1043-1 and 1043-2, and the weight calculation unit 1044 are used to calculate the weighting parameter $\delta_{b,m}$.

The late reflection characteristic setting unit 1041 calculates a late reflection transfer function $A_L'(\omega, d')$ as the late reflection characteristic from the RTF A'(ω, d') indicated by the reverberation characteristic data input from the reverberation characteristic estimation unit 103, and sets the calculated late reflection transfer function $A_L'(\omega, d')$ as a multiplier coefficient of the multiplier unit 1043-1.

Here, the late reflection characteristic setting unit 1041 calculates an impulse response obtained by transforming the RTF A'(ω, d') to the time domain, and extracts components from the calculated impulse response after a predetermined elapsed time (for example, 30 ms). The late reflection characteristic setting unit 1041 transforms the extracted components to the frequency domain and calculates the late reflection transfer function $A_L'(\omega, d')$.

The reverberation characteristic setting unit 1042 sets the RTF A'(ω, d') indicated by the reverberation characteristic data input from the reverberation characteristic estimation unit 103 as a multiplier coefficient of the multiplier unit 1043-2.

The multiplier units 1043-1 and 1043-2 multiply the frequency-domain coefficients, which are obtained by transforming the sound signals input from a predetermined sound source (not illustrated) into the frequency domain, by the set multiplier coefficients and calculate a reverbed speech frequency-domain coefficient r(ω, d', t) and a late reflection frequency-domain coefficient l(ω, d', t). Here, t represents the frame time at that time.

A database in which sound signals indicating clean speech are stored may be used as the sound source. When a speech signal from the sound source is reproduced, the sound signal may be directly input to the multiplier unit 1043-1 from the sound source and the sound signal input from the sound source separation unit 105 may be input to the multiplier unit 1043-2. The multiplier units 1043-1 and 1043-2 output the calculated reverbed speech frequency-domain coefficient r(ω, d', t) and the calculated late reflection frequency-domain coefficient l(ω, d', t) to the weight calculation unit 1044.

The weight calculation unit 1044 receives the reverbed speech frequency-domain coefficient r(ω, d', t) and the late reflection frequency-domain coefficient l(ω, d', t) from the multiplier units 1043-1 and 1043-2. The weight calculation unit 1044 calculates the weighting parameter $\delta_{b,m}$ in which the mean square error $E_m$ of the reverbed speech frequency-domain coefficient r(ω, d', t) and the late reflection frequency-domain coefficient l(ω, d', t) is the smallest for each frequency band $B_m$.

The mean square error $E_m$ is expressed, for example, by Expression (7).

$$E_m = \frac{1}{T_0} \sum_t \sum_{\omega \in B_m} |r(\omega, d', t) - \delta_{b,m} l(\omega, d', t)|^2 \quad (7)$$

In Expression (7), T0 represents a predetermined time length (for example, 10 seconds) to that time point. The weight calculation unit 1044 outputs correction data indicating the weighting parameter $\delta_{b,m}$ calculated for each frequency band $B_m$ to the dereverberation unit 106.

GHDSS Method

The GHDSS method will be described below.

The GHDSS method is a method of separating recorded sound signals of multiple channels into sound signals for sound sources. In this method, a separation matrix [V(ω)] is sequentially calculated, and an input speech vector [x(ω)] is multiplied by the separation matrix [V(ω)] to estimate a sound source vector [u(ω)]. The separation matrix [V(ω)] is a pseudo-inverse matrix of a transfer function matrix [H(ω)] having transfer functions from the sound sources to the microphones of the sound collection unit 12 as elements. The input speech vector [x(ω)] is a vector having frequency-domain coefficients of the sound signals of the channels as elements. The sound source vector [u(ω)] is a vector having the frequency-domain coefficients of the sound signals output from the sound sources as elements.

At the time of calculating the separation matrix [V(ω)], the sound source separation unit 105 calculates the sound source vector [u(ω)] so as to minimize two cost functions of the separation sharpness $J_{SS}$ and the geometric constraint $J_{GC}$.

The separation sharpness $J_{SS}$ is an index value indicating a degree to which one sound source is erroneously separated as different sound sources and is expressed, for example, by Expression (8).

$$J_{SS}=\|[u(\omega)][u(\omega)]^*-\mathrm{diag}([u(\omega)][u(\omega)]^*)\|^2 \quad (8)$$

In Expression (8), ‖ . . . ‖H² represents a Frobenius norm of . . . , and * represents the conjugate transpose of a vector or a matrix. diag( . . . ) represents a diagonal matrix having diagonal elements of . . . .

The geometric constraint $J_{GC}(\omega)$ is an index value indicating a degree of error of the sound source vector [u(ω)] and is expressed, for example, by Expression (9).

$$J_{GC}=\|\mathrm{diag}([V(\omega)][A(\omega)]-[I])\|^2 \quad (9)$$

In Expression (9), [I] represents a unit matrix.

Process of Predicting Acoustic Model

A process of predicting an acoustic model will be described below.

An acoustic model $\lambda^{(d)}$ is used for the speech recognition unit 108 to recognize phonemes based on the sound feature amount. The acoustic model $\lambda^{(d)}$ is, for example, a continuous hidden Markov model (continuous HMM). The continuous HMM is a model in which an output distribution density is a continuous function, and the output distribution density is weight-added with multiple normal distributions as a basis. The acoustic model $\lambda^{(d)}$ is defined by statistics such as a mixture weight $[C_{im}^{(d)}]$ for each normal distribution, a mean $\mu_{im}^{(d)}$, a covariance matrix $[\Sigma_{im}^{(d)}]$, a transition probability $a_{ij}^{(d)}$. Here, i and j are indices representing a current state and a transition destination state, respectively, and m is an index indicating the frequency band. The acoustic model $\lambda^{(c)}$ is also defined by the same types of statistics $[C_{im}^{(c)}]$, $\mu_{im}^{(c)}$, $[\Sigma_{im}^{(c)}]$, and $a_{ij}^{(c)}$ as the acoustic model $\lambda^{(d)}$.

The mixture weight $[C_{im}^{(d)}]$, the mean $\mu_{im}^{(d)}$, the covariance matrix $[\Sigma_{im}^{(d)}]$, and the transition probability $a_{ij}^{(d)}$ are expressed by sufficient statistics such as a probability of accumulated mixture component occupancy $L_{im}^{(d)}$, a probability of state occupancy $L_{ij}^{(d)}$, a mean $[m_{ij}^{(d)}]$, and a variance $[v_{ij}^{(d)}]$ and has relationships expressed by Expressions (10) to (13).

$$C_{im}^{(d)}=L_{im}^{(d)}/\Sigma_{m=1}^{M}L_{im}^{(d)} \quad (10)$$

$$[\mu_{im}^{(d)}]=[m_{ij}^{(d)}]/L_{im}^{(d)} \quad (11)$$

$$[\Sigma_{im}^{(d)}]=[v_{ij}^{(d)}]/L_{im}^{(d)}-[\mu_{im}^{(d)}][\mu_{im}^{(d)}]^T \quad (12)$$

$$a_{ij}^{(d)}=L_{ij}^{(d)}/\Sigma_{j=1}^{J}L_{ij}^{(d)} \quad (13)$$

In Expression (13), i and j are indices representing a current state and a transition destination state, respectively and J represents the number of transition destination states. In the following description, the probability of accumulated mixture component occupancy $L_{im}^{(d)}$, the probability of state occupancy $L_{ij}^{(d)}$, the mean $[m_{ij}^{(d)}]$, and the variance $[v_{ij}^{(d)}]$ are collectively referred to as priors $\delta^{(d)}$.

The acoustic model updating unit 107 generates an acoustic model λ' by performing linear prediction (interpolation or extrapolation) with a coefficient τ(d') corresponding to the distance d' with the acoustic model $\lambda^{(d)}$ as a basis using the acoustic models $\lambda^{(d)}$ and $\lambda^{(c)}$. The acoustic model updating unit 107 uses, for example, Expressions (14) to (17) to generate the acoustic model λ'.

$$C'_{im} = \frac{L_{im}^{(d)} + \tau(d')L_{im}^{(c)}}{\sum_{m=1}^{M} L_{im}^{(d)} + \tau(d')L_{im}^{(c)}} \quad (14)$$

$$[\mu'_{im}] = \frac{[m_{im}^{(d)}] + \tau(d')[m_{im}^{(c)}]}{\sum_{m=1}^{M} L_{im}^{(d)} + \tau(d')L_{im}^{(c)}} \quad (15)$$

$$[\Sigma'_{im}] = \frac{[v_{im}^{(d)}] + \tau(d')[m_{im}^{(c)}]}{L_{im}^{(d)} + \tau(d')L_{im}^{(c)}} - [\mu_{im}^{(d)}][\mu_{im}^{(d)}]^T \quad (16)$$

$$a'_{ij} = \frac{L_{ij}^{(d)} + \tau(d')L_{ij}^{(c)}}{\sum_{j=1}^{J} L_{ij}^{(d)} + \tau(d')L_{ij}^{(c)}} \quad (17)$$

In Expressions (14) to (17), $L_{im}^{(c)}$, $L_{ij}^{(c)}$, $[m_{im}^{(c)}]$, and $[v_{ij}^{(c)}]$ represent the probability of accumulated mixture component occupancy, the probability of state occupancy, the mean, and the variance in the acoustic model $\lambda^{(c)}$ associated with the close-talking speech and are collectively referred to as priors $\beta^{(c)}$. The coefficient τ(d') is a function of which the value is 0 when d'=0 and the coefficient τ(d') decreases with an increase of d'. As d' approaches 0, the coefficient τ(d') approaches the infinity.

The priors $\beta^{(c)}$ increase with an increase in the power level and thus vary depending on the distance d'. As expressed by Expressions (14) to (17), an acoustic model is predicted with high accuracy by performing the linear prediction based on such statistics.

A speech processing flow according to the first embodiment will be described below.

Figure 5:
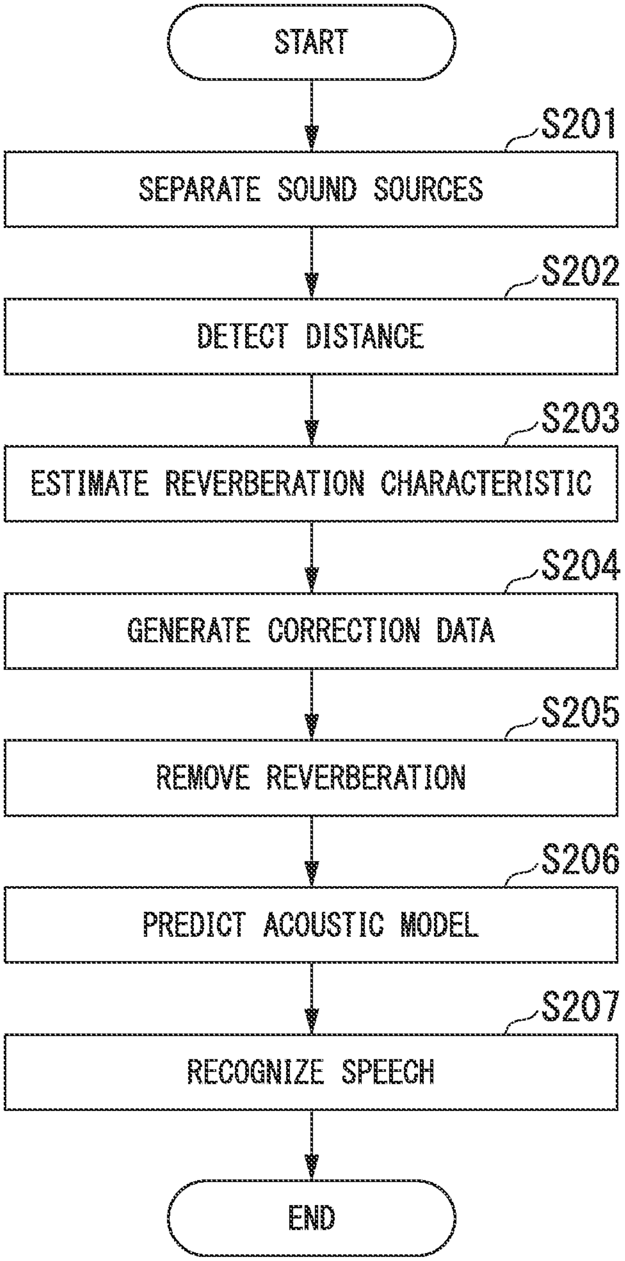
FIG. 5 is a flowchart illustrating a speech processing flow according to the first embodiment.

FIG. 5 is a flowchart illustrating the speech processing flow according to the first embodiment.

(Step S201) The sound source separation unit 105 performs a sound source separating process on the sound signals of N channels input from the sound collection unit 12 and separates the sound signals into sound signals for one or more sound sources. The sound source separation unit 105 outputs the separated sound signals for the sound sources to the correction data generation unit 104 and the dereverberation unit 106. Thereafter, the process proceeds to step S202.

(Step S202) The distance detection unit 101 detects the distance d' from the sound source to the center of the sound collection unit 12 and outputs distance data indicating the detected distance d' to the reverberation estimation unit 102 and the acoustic model updating unit 107. Thereafter, the process proceeds to step S203.

(Step S203) The reverberation characteristic estimation unit 103 estimates the reverberation characteristic corresponding to the distance d' indicated by the distance data based on a predetermined acoustic model and outputs reverberation characteristic data indicating the estimated reverberation characteristic to the correction data generation unit 104. Thereafter, the process proceeds to step S204.

(Step S204) The correction data generation unit 104 generates the correction data indicating the weighting parameter $\delta_{b,m}$ for each predetermined frequency band $B_m$ for each sound source based on the reverberation characteristic data input from the reverberation characteristic estimation unit 103. The correction data generation unit 104 outputs the generated correction data to the dereverberation unit 106. Thereafter, the process proceeds to step S205.

(Step S205) The dereverberation unit 106 separates the sound signals input from the sound source separation unit 105 into components for the frequency bands $B_m$. The dereverberation unit 106 removes the late reflection component which is part of the reverberation using the weighting parameter $\delta_{b,m}$ indicated by the dereverbing data input from the reverberation estimation unit 102 for each separated band component. The dereverberation unit 106 outputs the dereverbed speech signals from which the reverberation is removed to the speech recognition unit 108. Thereafter, the process proceeds to step S206.

(Step S206) The acoustic model updating unit 107 generates an acoustic model λ' by prediction from the two acoustic models $\lambda^{(c)}$ and $\lambda^{(d)}$ based on the distance d' indicated by the distance data input from the distance detection unit 101. The acoustic model updating unit 107 updates the acoustic models used by the speech recognition unit 108 to the acoustic model λ' generated by itself. Thereafter, the process proceeds to step S207.

(Step S207) The speech recognition unit 108 performs a speech recognizing process on the dereverbed speech signals input from the dereverberation unit 106 using the acoustic model λ' set by the acoustic model updating unit 107 and recognizes speech details. Thereafter, the process flow illustrated in FIG. 5 ends.

Example of RTF

An example of the RTF will be described below.

Figure 6:
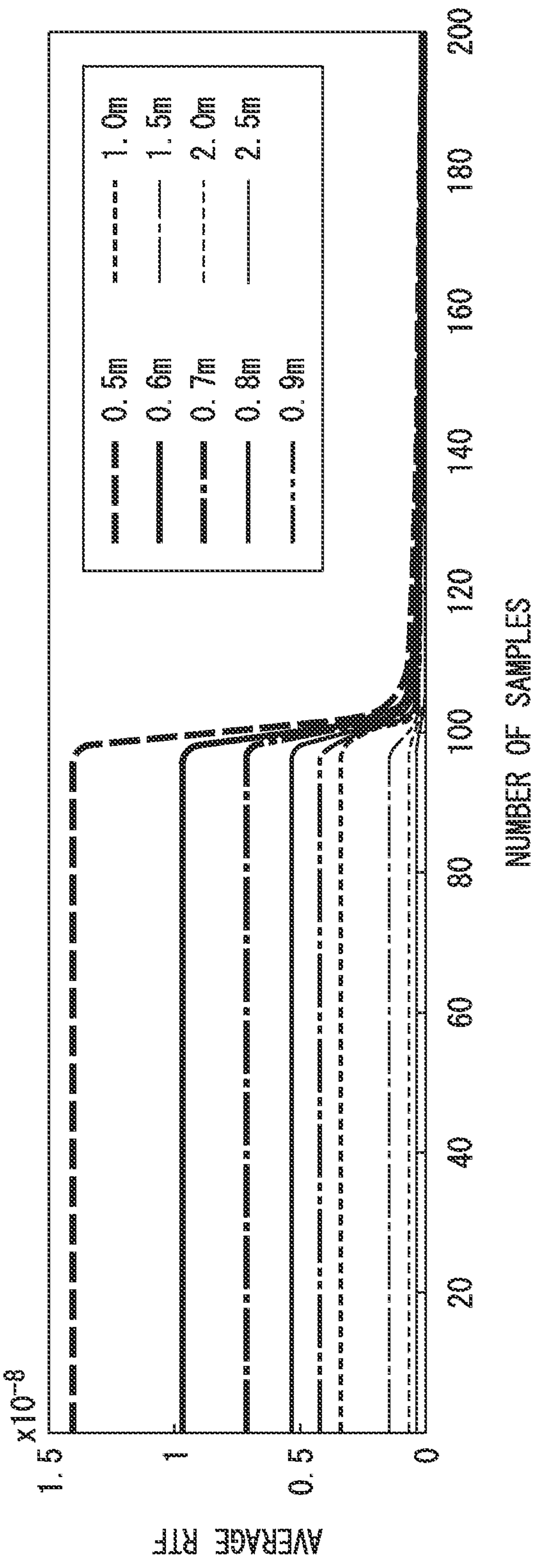
FIG. 6 is a diagram illustrating an example of an average RTF.

FIG. 6 is a diagram illustrating an example of an average RTF.

The horizontal axis represents the number of samples and the vertical axis represents the average RTF. In this example, one sample corresponds to one frame. In FIG. 6, the average RTF when the distance d is 0.5 m, 0.6 m, 0.7 m, 0.9 m, 1.0 m, 1.5 m, 2.0 m, and 2.5 m is expressed by a curve. The average RTF decreases with an increase in the distance d. For example, when the distance d is 0.5 m, 1.0 m, and 2.0 m, the average RTF is $1.4\times10^{-8}$, $0.33\times10^{-8}$, and $0.08\times10^{-8}$, and decreases with an increase in the distance d. The average RTF of the samples subsequent to the 100-th sample decreases to almost 0 regardless of the distance d.

This supports that the phase does not depend on the distance d, that is, the above-mentioned assumption (i).

Figure 7:
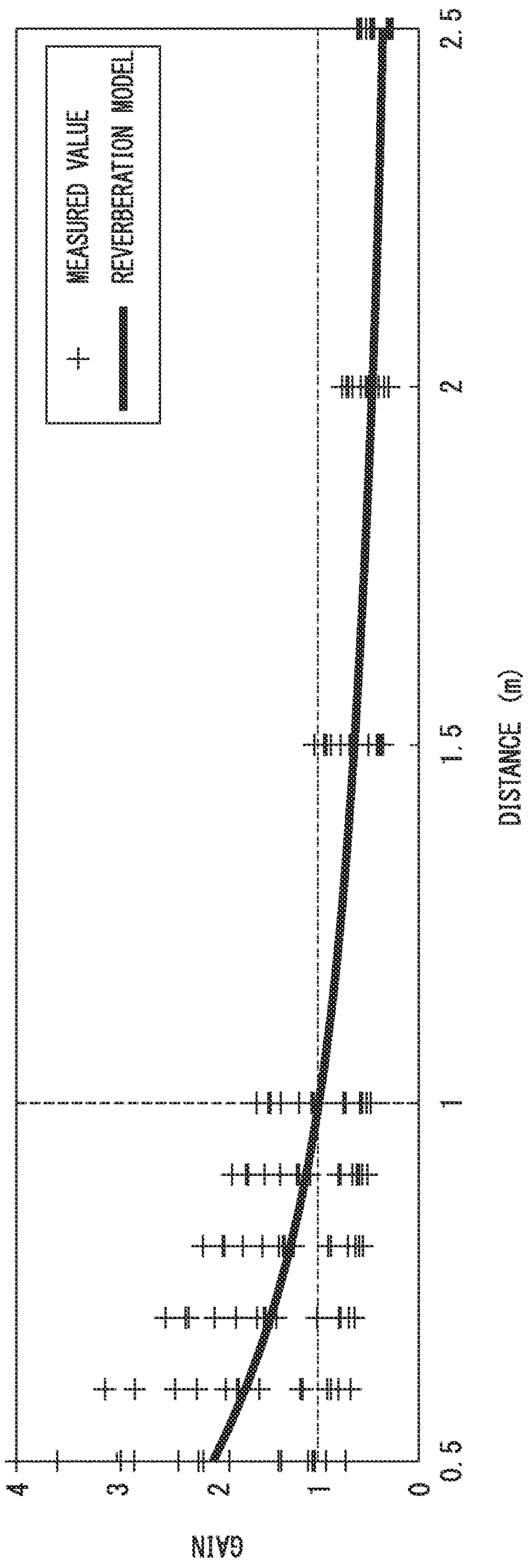
FIG. 7 is a diagram illustrating an example of an RTF gain.

FIG. 7 is a diagram illustrating an example of a gain of the RTF.

The horizontal axis represents the distance and the vertical axis represents the gain. In this example, the measured value of the gain of the RTF is indicated by marks + and the estimated value based on the above-mentioned acoustic model is indicated by a solid line. The measurement value is distributed around the estimated value and has a tendency that the variance increases with a decrease in the distance d. However, the maximum values and the minimum values of the measured values at the distances d are almost inversely proportional to the distance d. For example, the maximum value of the measured values is 3.6, 1.7, and 0.8 for the distances of 0.5 m, 1.0 m, and 2.0 m, respectively. Therefore, the measured values can approach the estimated values by adjusting the coefficients $\alpha_1$ and $\alpha_2$. This point supports the above-mentioned assumption (ii).

Example of Acoustic Model

An example of an acoustic model will be described below.

Figure 8:
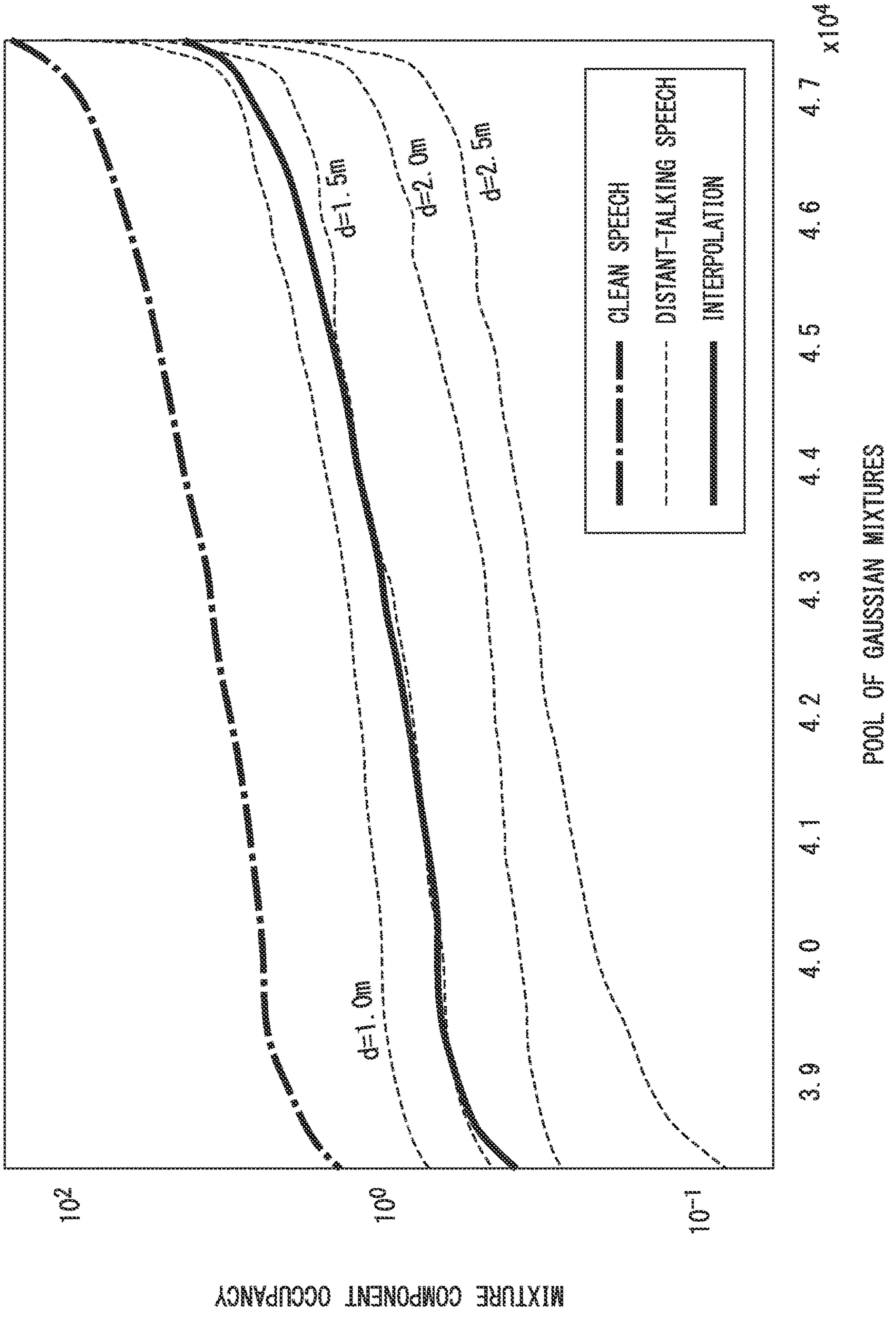
FIG. 8 is a diagram illustrating an example of an acoustic model.

FIG. 8 is a diagram illustrating an example of an acoustic model.

The horizontal axis and the vertical axis represent a pool of Gaussian mixtures and a mixture component occupancy, respectively. The pool of Gaussian mixtures is the number of normal distributions used in the acoustic model and is simply referred to as a “mixture number”. The mixture component occupancy is the number of mixture components in the acoustic model. The probability of accumulated mixture component occupancy is determined based on the mixture component occupancy. The one-dot chained line and the dotted line represent the mixture component occupancies for clean speech and distant-talking speech, respectively. The mixture component occupancy for the distant-talking speech is illustrated for each distance d of 1.0 m, 1.5 m, 2.0 m, and 2.5 m. The solid line indicates the mixture component occupancy in which the mixture component occupancy of clean speech and the mixture component occupancy of the distant-talking speech (distance d of 2.5 m) are interpolated for each mixture number with the distance d'=1.5 as a target distance.

In the example illustrated in FIG. 8, the mixture component occupancy for each mixture number is the largest for the clean speech and decreases with an increase in the distance d. The dependency of the mixture component occupancy on the mixture number exhibits the same tendency in the clean speech and the distant-talking speech and also exhibits the same tendency in the distant-talking speech having different distances d to the sound source. In this example, the interpolated mixture component occupancy almost matches the mixture component occupancy of the distant-talking speech at the distance d=1.5 m. This means that the acoustic model interpolated depending the detected distance d' from the existing acoustic models of the clean speech and the distant-talking speech at the distance d approaches the acoustic model of the distant-talking speech at the same distance.

Test Result

A test result in which the speech recognition accuracy is verified using the speech processing device 11 according to the first embodiment will be described below.

The test was carried out in two test rooms Rm1 and Rm2 having different reverberation characteristics and the reverberation times $T_{60}$ of the test room Rm1 and Rm2 were 240 ms and 640 ms, respectively. In each test room, a speaking person was made to utter speech 200 times at each of four distances d' (1.0 m, 1.5 m, 2.0 m, and 2.5 m) and a word recognition rate was observed at that time. The number of words to be recognized was 20,000 words. The language model used by the speech recognition unit 108 was a standard word trigram model. The number of RTFs $A(\omega, d_i)$ $i_d$ previously acquired was three. The distance $d_i$ was 0.5 m, 1.3 m and 3.0 m. The number of microphones N of the sound collection unit 12 was ten.

A phonetically tied mixture (PTM) HMM including total 8256 normal distributions which is a kind of continuous HMM was used as acoustic models. When acoustic models were trained, a Japanese newspaper article sentence (JNAS) corpus was used as a training database for clean speech.

In the test, speech was processed using the following seven methods and the processed speech was subjected to the speech recognition.

Method A. The speech is unprocessed.

Method B. Existing blind dereverberation is performed.

Method C. Existing spectral subtraction (Non-patent Documents 1 and 2) is performed.

Method D. The late reflection component is removed by the dereverberation unit 106 (first embodiment).

Method E. The late reflection component of the measured RTF is removed.

Method F. The late reflection component is removed by the dereverberation unit 106 and the acoustic model is updated by the acoustic model updating unit 107 (first embodiment).

Method G. An acoustic model re-trained depending on the distances in Method F is used.

Example of Word Recognition Rate

FIG. 9 is a diagram illustrating an example of a word recognition rate for each processing method.

The rows represent the methods (Methods A to G) of processing speech and the columns represent the word recognition rate (% in unit) for each distance in the rooms Rm1 and Rm2.

Out of the rooms Rm1 and Rm2, the room Rm2 having a longer reverberation time has a lower word recognition rate. In the same room, the larger the distance becomes, the lower the word recognition rate becomes. The word recognition rate increases in the order of Methods A, B, C, D, E, F, and G (the word recognition rate is the largest in Method G). For example, when the distance d in the room Rm1 is 2.5 m, 47.7% in Method D according to the first embodiment is significantly higher than 44.6% in Method C according to Non-patent Document 1 and is almost equal to 47.9% in Method E using the measured RTF. That is, it can be seen that the word recognition rate is improved by removing part of the estimated reverberation depending on the detected distance d'. 54.0% in Method F according to the first embodiment is significantly higher than 47.7% in Method E and is almost equal to 55.2% in Method G using the re-trained acoustic model.

The speech recognizing process using the acoustic model re-trained depending on the distance d' was performed in Methods A, B, C, and D and the word recognition rates thereof were observed.

Figure 10:
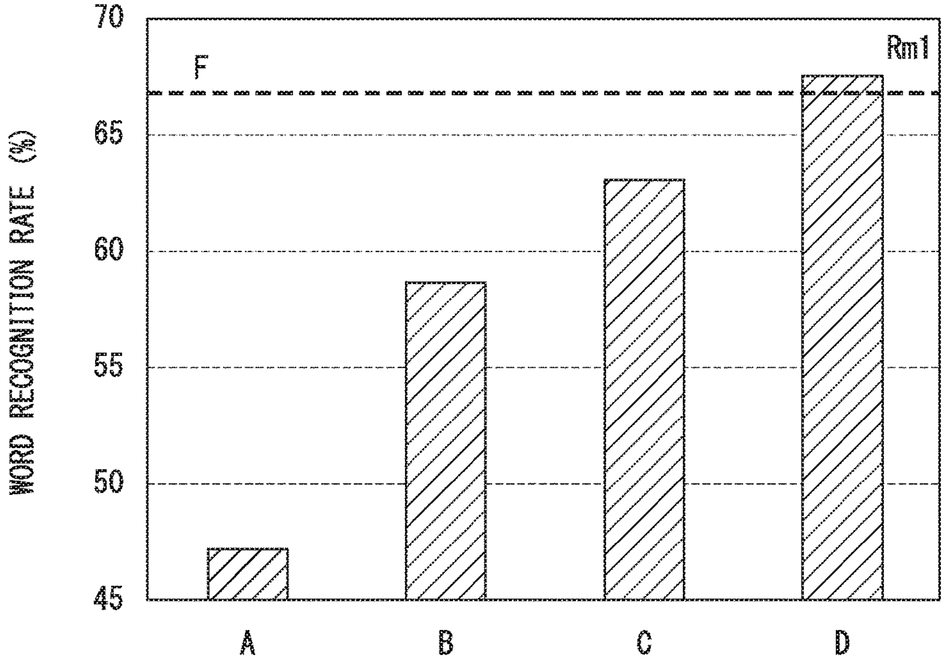
FIG. 10 is a diagram illustrating another example of the word recognition rate for each processing method.
Figure 11:
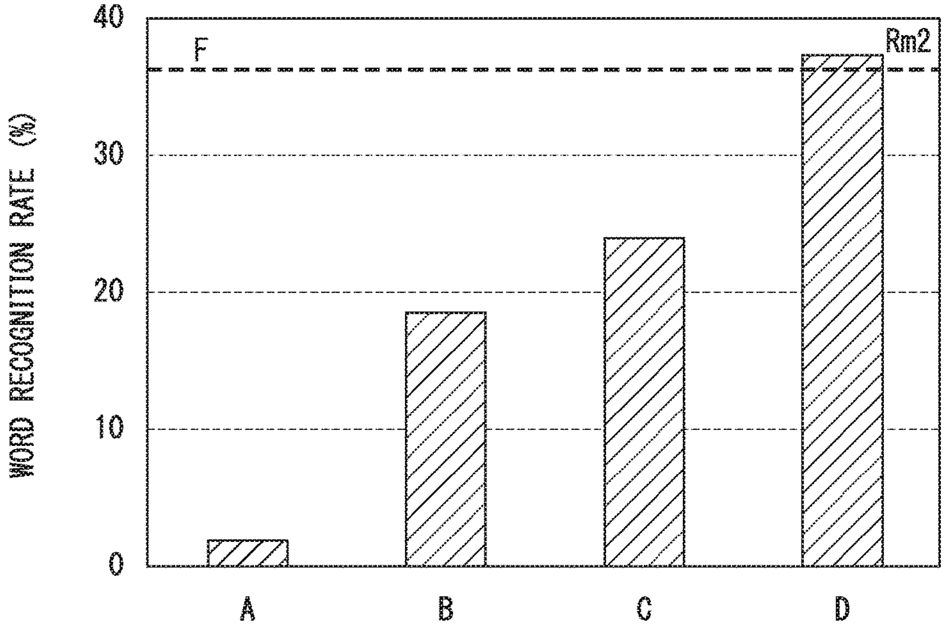
FIG. 11 is a diagram illustrating another example of the word recognition rate for each processing method.

FIGS. 10 and 11 are diagrams illustrating the word recognition rate for each processing method observed in the rooms Rm1 and Rm2 as another example of the word recognition rate.

In FIGS. 10 and 11, the horizontal axis represents Methods A, B, C, and D and the vertical axis represents the average word recognition rate at the distances of 1.0 m, 1.5 m, 2.0 m, and 2.5 m. For the purpose of comparison, the word recognition rate in Method F is indicated by a dotted line.

As illustrated in FIGS. 10 and 11, the word recognition rate in each room and each method is improved by re-training the acoustic model. Particularly, the word recognition rate in Method D according to the first embodiment is 68% (FIG. 10) and 38% (FIG. 11) and is almost equal to 67% (FIG. 10) and 37% (FIG. 11) in Method F. This means that the accuracy equivalent to the acoustic model trained under the reverberation environment depending on the distance d' can be obtained by using the acoustic model predicted depending on the distance d' at which the acoustic model is detected.

As described above, the first embodiment includes the distance acquisition unit (for example, the distance detection unit 101) configured to acquire the distance between the sound collection unit (for example, the sound collection unit 12) recording a sound from a sound source and the sound source and the reverberation characteristic estimation unit (for example, the reverberation characteristic estimation unit 103) configured to estimate the reverberation characteristic corresponding to the acquired distance. The first embodiment further includes the correction data generation unit (for example, the correction data generation unit 104) configured to generate the correction data indicating the contribution of a reverberation component from the estimated reverberation characteristic and the dereverberation unit (for example, the dereverberation unit 106) configured to remove the reverberation component by correcting the amplitude of the speech based on the correction data.

Accordingly, since the reverberation component indicated by the reverberation characteristic estimated depending on the acquired distant at that time is removed from the recorded speech, it is possible to improve the reverberation reduction accuracy.

In the first embodiment, since the reverberation characteristic estimation unit estimates the reverberation characteristic including the component inversely proportional to the acquired distance, it is possible to estimate the reverberation characteristic (for example, the late reflection component) with a smaller computational load without damaging the accuracy by assuming that the reverberation component includes the component inversely proportional to the distance from the sound source to the sound collection unit.

In the first embodiment, since the reverberation characteristic estimation unit estimates the reverberation characteristic using the coefficient indicating the contribution of the inversely-proportional component determined based on a reverberation characteristic measured in advance under the reverberation environment, it is possible to estimate the reverberation characteristic at that time with a smaller computational load. This estimation can be carried out in real time.

In the first embodiment, the correction data generation unit generates the correction data for each predetermined frequency band and the dereverberation unit corrects the amplitude for each frequency band using the correction data of the corresponding frequency band, whereby the reverberation component is removed. Accordingly, since the reverberation component is removed in consideration of reverberation characteristics (for example, the lower the frequency becomes, the higher the reverberation level becomes) different depending on the frequency bands, it is possible to improve the reverberation reduction accuracy.

The first embodiment includes the acoustic model prediction unit (for example, the acoustic model updating unit 107) configured to predict an acoustic model corresponding to the distance acquired by the distance acquisition unit from the first acoustic model (for example, a distant acoustic model) trained using reverbed speech from a predetermined distance and the second acoustic model (for example, a clean acoustic model) trained using speech under an environment in which the reverberation is negligible. The first embodiment further includes the speech recognition unit (for example, the speech recognition unit 108) configured to perform the speech recognizing process using the predicted acoustic model.

Accordingly, since the acoustic model predicted based on the distance from the sound source to the sound collection unit is used for the speech recognizing process, it is possible to improve the speech recognition accuracy under a reverberation environment depending on the distance. For example, even when the component based on the late reflection is not removed, the variation of the sound feature amount due to reflection such as the early reflection is sequentially considered and it is thus possible to improve the speech recognition accuracy.

Second Embodiment

The configuration of a speech processing device **11*a*** according to a second embodiment of the present invention will be described below. The same elements as in the above-mentioned embodiment will be referenced by the same reference signs and the description thereof will be employed therein.

Figure 12:
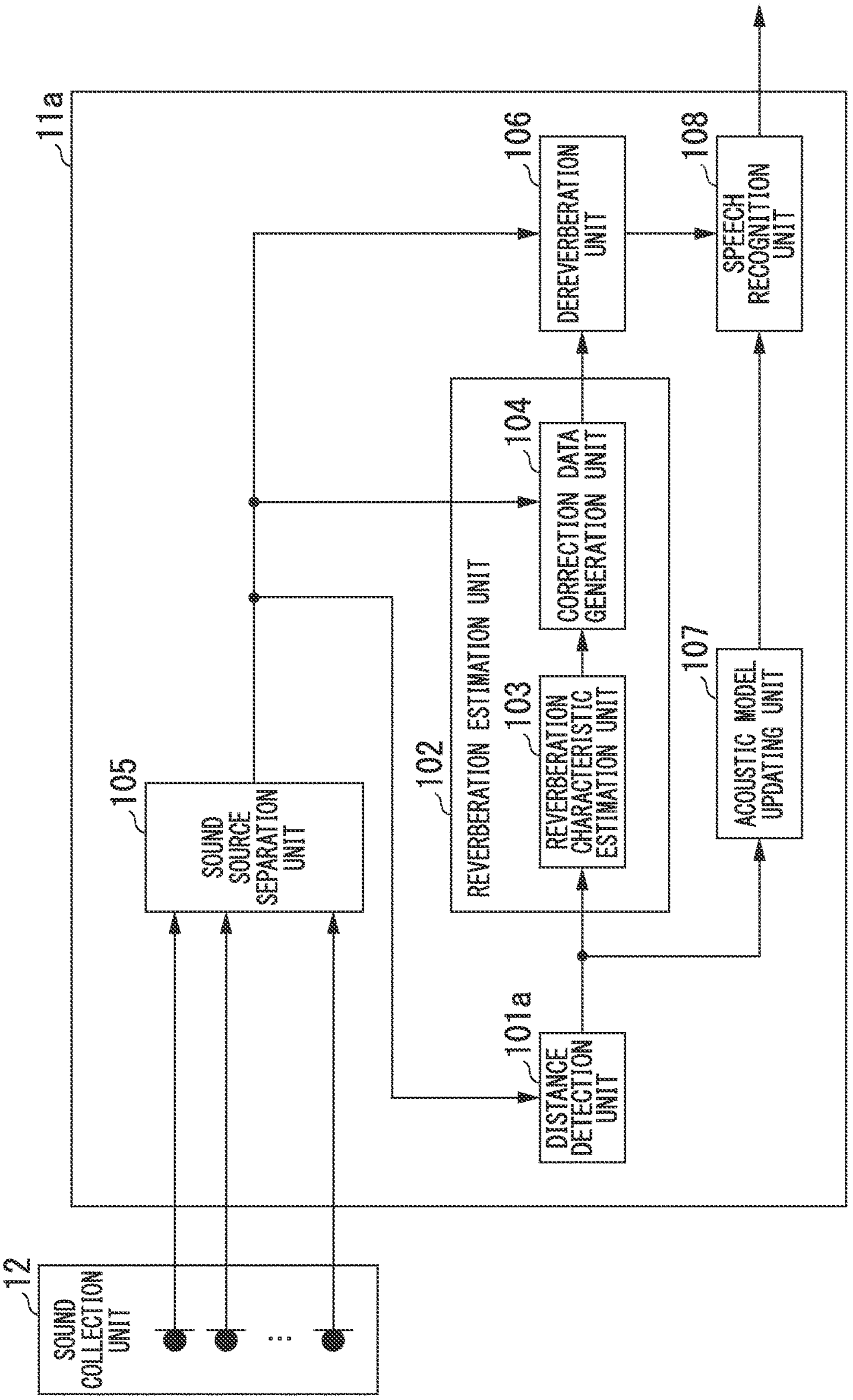
FIG. 12 is a block diagram schematically illustrating a configuration of a speech processing device according to a second embodiment of the present invention.
Figure 13:
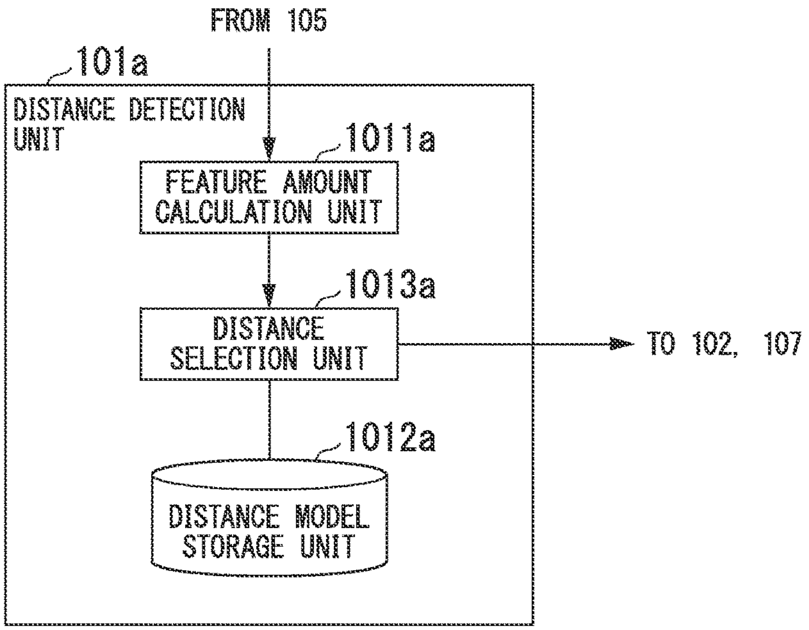
FIG. 13 is a block diagram schematically illustrating a configuration of a distance detection unit according to the second embodiment.

FIG. 12 is a block diagram schematically illustrating the configuration of the speech processing device **11*a*** according to the second embodiment.

The speech processing device **11*a* includes a distance detection unit 101*a*, a reverberation estimation unit 102, a sound source separation unit 105, a dereverberation unit 106, an acoustic model updating unit 107, and a speech recognition unit 108. That is, the speech processing device 11*a* includes the distance detection unit 101*a* instead of the distance detection unit 101 in the speech processing device 11 (FIG. 2**).

The distance detection unit **101*a* estimates the distance d' of each sound source based on a sound signal for each sound source input from the sound source separation unit 105, and outputs distance data indicating the estimated distance d' to the reverberation estimation unit 102 and the acoustic model updating unit 107. Here, the distance detection unit 101*a* stores distance model data including statistics indicating the relationship between a predetermined sound feature amount and the distance from the sound source to the sound collection unit for each different distance, and selects the distance model data having the largest likelihood for the sound feature amount of the input sound signal. The distance detection unit 101*a*** determines the distance d' corresponding to the selected distance model data.

Configuration of Distance Detection Unit

FIG. β is a block diagram schematically illustrating the configuration of the distance detection unit **101*a*** according to the second embodiment.

The distance detection unit **101*a* includes a feature amount calculation unit 1011*a*, a distance model storage unit 1012*a*, and a distance selection unit 1013*a***.

The feature amount calculation unit **1011*a* calculates a sound feature amount T(u') for each predetermined time interval (for example, 10 ms) from a sound signal input from the sound source separation unit 105**. The sound feature amount is, for example, a combination of a static Mel-scale log spectrum (static MSLS), delta MSLS, and single delta power. A vector having these coefficients as elements is referred to as a feature vector.

The feature amount calculation unit **1011*a* outputs the feature amount data indicating the calculated sound feature amount T(u') to the distance selection unit 1013*a***.

The distance model storage unit **1012*a*** stores distance models $\alpha^{(d)}$ in correlation with D (where D is an integer greater than 1, for example, 5) distances d. Examples of the distance d include 0.5 m, 1.0 m, 1.5 m, 2.0 m, and 2.5 m. The distance model $\alpha^{(d)}$ is, for example, a Gaussian mixture model (GMM).

The GMM is a kind of acoustic model in which the output probabilities for input sound feature amounts are weighted and added with multiple (for example, 256) normal distributions as a basis. Accordingly, the distance model $\alpha^{(d)}$ is defined by statistics such as a mixture weight, a mean, and a covariance matrix. When the GMM is trained using the distances d, the distance model storage unit **1012*a*** determines the statistic in advance so that the likelihood is the maximum using training speech signals to which the reverberation characteristics at the distances d are added.

The mixture weight, the mean, and the covariance matrix have a relationship expressed by Expressions (10) to (12) with the priors $\beta^{(d)}$ constituting the HMM. The priors $\beta^{(d)}$ are coefficients varying with a variation in the distance d. Accordingly, the HMM may be trained so that the likelihood is the maximum using the training speech signals for each distance d, and the GMM may be constructed using the priors $\beta^{(d)}$ obtained by training.

The distance selection unit **1013*a* calculates the likelihood $P(T(u')|\alpha^{(d)})$ of the sound feature amount T(u') indicated by the feature amount data input from the feature amount calculation unit 1011*a* for each of the distance models $\alpha^{(d)}$ stored in the distance model storage unit 1012*a*. The distance selection unit 1013*a* selects the distance d corresponding to the distance model $\alpha^{(d)}$ in which the calculated likelihood $P(T(u')|\alpha^{(d)})$ is the maximum as the distance d' and outputs the distance data indicating the selected distance d' to the reverberation estimation unit 102 and the acoustic model updating unit 107**.

Accordingly, it is possible to estimate the distance from the sound collection unit 12 to the sound source, for example, a speaking person, without including hardware for measuring the distance d' and to reduce the reverberation based on the estimated distance.

Distance Detecting Process

The distance detecting process according to the second embodiment will be described below. In the second embodiment, the following process is performed instead of the distance detecting process (step S202) illustrated in FIG. 5.

Figure 14:
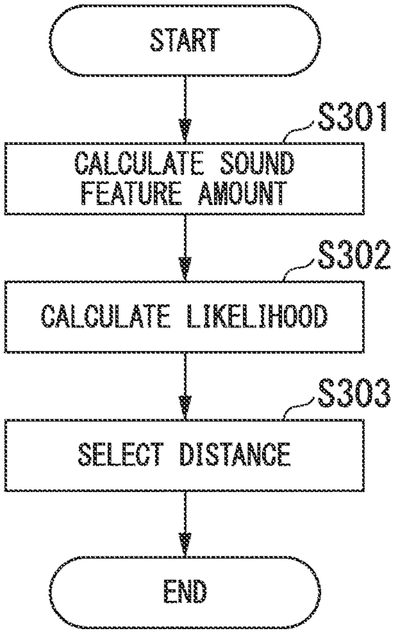
FIG. 14 is a flowchart illustrating a distance detecting process according to the second embodiment.

FIG. 14 is a flowchart illustrating the distance detecting process according to the second embodiment.

(Step S301) The feature amount calculation unit **1011*a* calculates the sound feature amount T(u') of sound signals input from the sound source separation unit 105 for each predetermined time interval. The feature amount calculation unit 1011*a* outputs the feature amount data indicating the calculated sound feature amount T(u') to the distance selection unit 1013*a*. Thereafter, the process proceeds to step S302**.

(Step S302) The distance selection unit 1013*a* calculates the likelihood $P(T(u')|\alpha^{(d)})$ of the sound feature amount T(u') indicated by the feature amount data input from the feature amount calculation unit 1011*a* for each of the distance models $\alpha^{(d)}$ stored in the distance model storage unit 1012*a*. Thereafter, the process proceeds to step S303.

(Step S303) The distance selection unit 1013*a* selects the distance d corresponding to the distance model $\alpha^{(d)}$ in which the calculated likelihood $P(T(u')|\alpha^{(d)})$ is the maximum as the distance d' and outputs the distance data indicating the selected distance d' to the reverberation estimation unit 102 and the acoustic model updating unit 107.

Thereafter, the process flow illustrated in FIG. 14 ends.

In the second embodiment, the acoustic model updating unit 107 may store the acoustic model $\lambda^{(d)}$ generated by training using the distant-talking speech uttered at different distances d in advance. In this case, the acoustic model updating unit 107 reads the acoustic model $\lambda^{(d')}$ corresponding to the distance data input from the distance detection unit 101*a* and updates the acoustic model used by the speech recognition unit 108 to the read acoustic model $\lambda^{(d')}$.

Test Result

A test result in which the distance estimation accuracy and the speech recognition accuracy are verified using the speech processing device 11*a* according to the second embodiment will be described below.

The test was carried out in the above-mentioned two test rooms Rm1 and Rm2. In each test room, ten speaking people were made to utter speech 50 times at each of five distances d' (0.5 m, 1.0 m, 1.5 m, 2.0 m, and 2.5 m) and a word recognition rate was observed at that time. The number of words to be recognized was 1,000 words. The language model used by the speech recognition unit 108 was a standard word trigram model. When the above-mentioned PTM HMM or the GMM used to estimate a distance were trained, a JNAS corpus was used. Here, the number of Gaussian mixtures was set to 256. The number of Gaussian mixtures is the number of normal distributions constituting the GMM. The other conditions were the same as in the test described in the first embodiment.

In the test, speech was processed using the following four methods and the processed speech was subjected to the speech recognition.

Method A. Compensation based on the distance d' is not performed (No compensation).

Method B. Reverberation compensation using existing estimated RTF is performed (RTF compensation (Estimated)).

Method C. Reverberation compensation using existing measured RTF is performed (RTF compensation (Measured)).

Method D. Reverberation compensation based on the distance estimated by the distance detection unit 101*a* is performed (second embodiment).

Example of Word Recognition Rate

Figure 15:
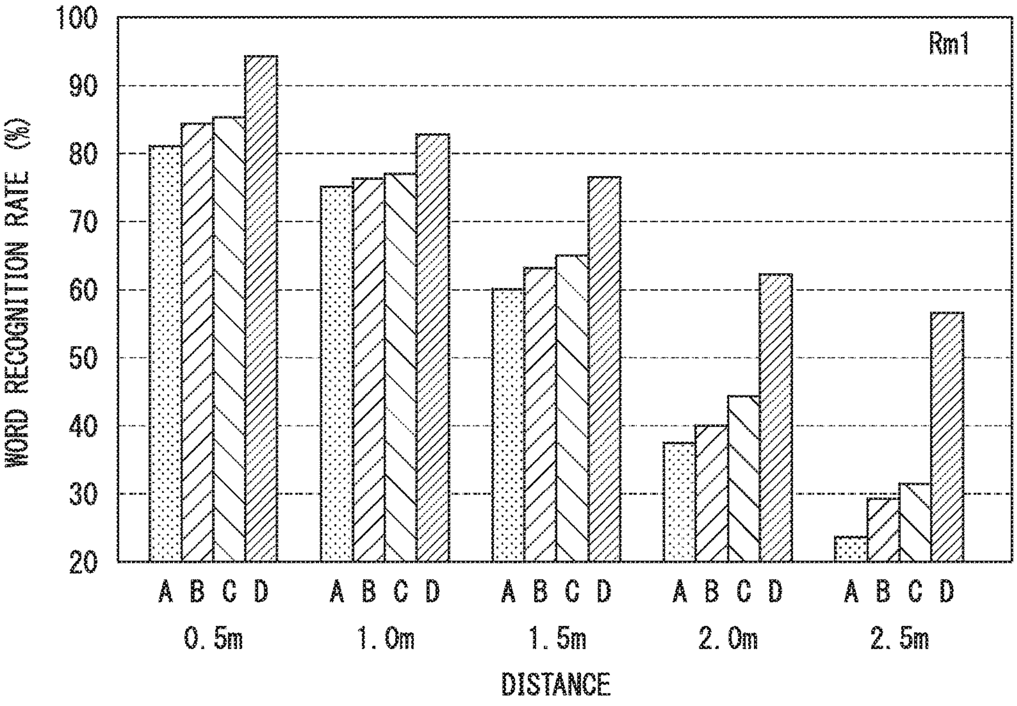
FIG. 15 is a diagram illustrating an example of a word recognition rate for each processing method.
Figure 16:
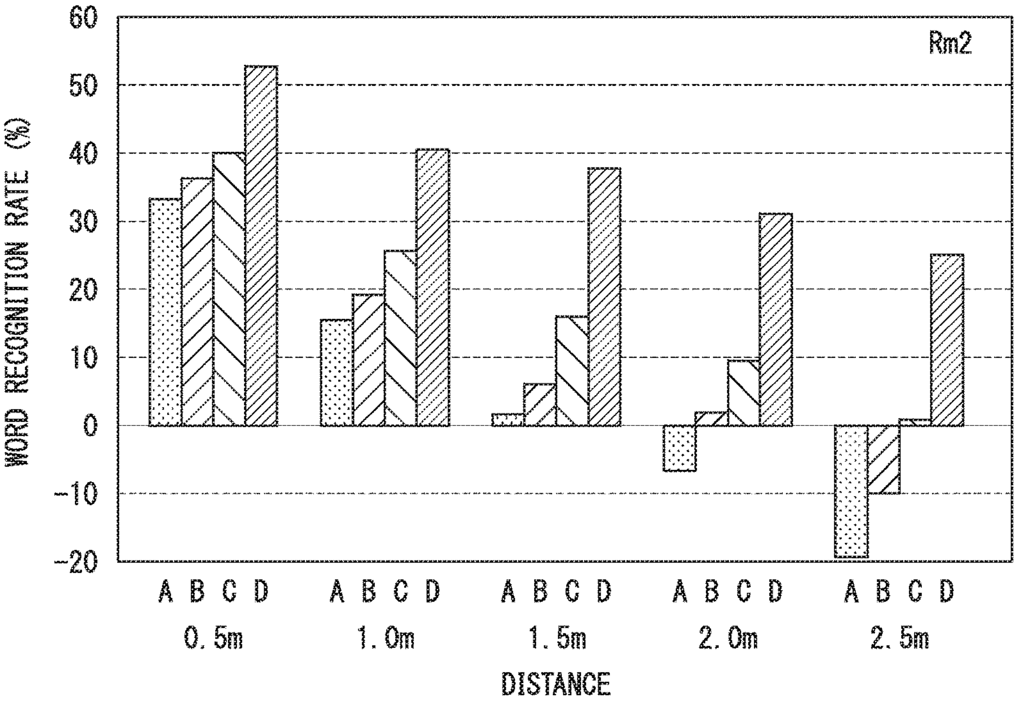
FIG. 16 is a diagram illustrating another example of the word recognition rate for each processing method.

FIGS. 15 and 16 are diagrams illustrating an example of a word recognition rate for each processing method.

In FIGS. 15 and 16, the horizontal axis represents the distance d' and the vertical axis represents the word recognition rate (% in unit).

Out of the rooms Rm1 and Rm2, the room Rm2 having a more marked reverberation has a lower word recognition rate. In the same room, the larger the distance becomes, the lower the word recognition rate becomes.

The word recognition rate increases in the order of Methods A, B, C, and D (the word recognition rate is the largest in Method D). For example, when the distance d in the room Rm1 is 2.0 m, 59% in Method D according to the second embodiment is significantly higher than 37%, 40%, and 43% in Methods A, B, and C. For example, when the distance d in the room Rm2 is 2.0 m, 32% in Method D according to the second embodiment is significantly higher than −7%, 2%, and 11% in Methods A, B, and C.

In Method D according to the second embodiment, the late reflection component estimated at that time is removed depending on the estimated distances d' and the estimated acoustic model is used. Accordingly, it can be seen that it is possible to realize high accuracy which could not be obtained using even the RTF.

Verification of Mixture Number

Verification which was performed on the correct answer rate of the distance based on the mixture number in order to determine an appropriate mixture number before performing the above-mentioned test was carried out will be described below. In each performance of the test, one of three predetermined locations was randomly selected as the position of a sound source. These three locations are referred to as Loc1, Loc2, and Loc3. The GMM corresponding to each of the locations was generated in advance. The mixture numbers in the GMMs are nine types of 2, 4, 8, 16, 32, 64, 128, 256, and 512. Here, a case where the position of the sound source matches the selected GMM was evaluated to be a correct answer and the other cases were evaluated to be an incorrect answer.

Example of Correct Answer Rate of Distance

FIG. 17 is a diagram illustrating an example of a distance correct answer rate.

The rows represent the mixture numbers, the columns represent the correct answer rates (% in unit) at the positions of the sound source in the room Rm1 and Rm2.

Out of the rooms Rm1 and Rm2, the room Rm2 having a longer reverberation time has a lower correct answer rate. In the same room, the larger the mixture number becomes, the lower the word recognition rate becomes. In each room, there was no significant difference in the correct answer rate between the positions of the sound source.

For example, when the position of the sound source in the room Rm1 is Loc1 and the mixture number includes to 2, 4, 8, 16, 32, 64, 128, 256, and 512, the correct answer rate increases to 10%, 18%, 29%, 40%, 57%, 79%, 90%, 98%, and 98%. When the mixture number is greater than 256, the variation of the correct answer rate is saturated. Therefore, it is possible to secure the estimation accuracy by determining the mixture number to be 256.

As described above, in the second embodiment, the distance acquisition unit (for example, the distance detection unit 101*a*) includes acoustic models trained using speech at predetermined distances and selects the distance corresponding to the acoustic model having the highest likelihood. Accordingly, it is possible to improve the reverberation reduction accuracy without including hardware for acquiring the distance. It is possible to improve the speech recognition accuracy by using dereverbed speech for the speech recognizing process.

Modification Example

The above-mentioned embodiment may be modified in the following modification examples.

Differences from the speech processing device 11*a* (FIG. 12) will be mainly described below. The same elements as in the above-mentioned embodiment will be referenced by the same reference signs and the description thereof will be employed.

Figure 18:
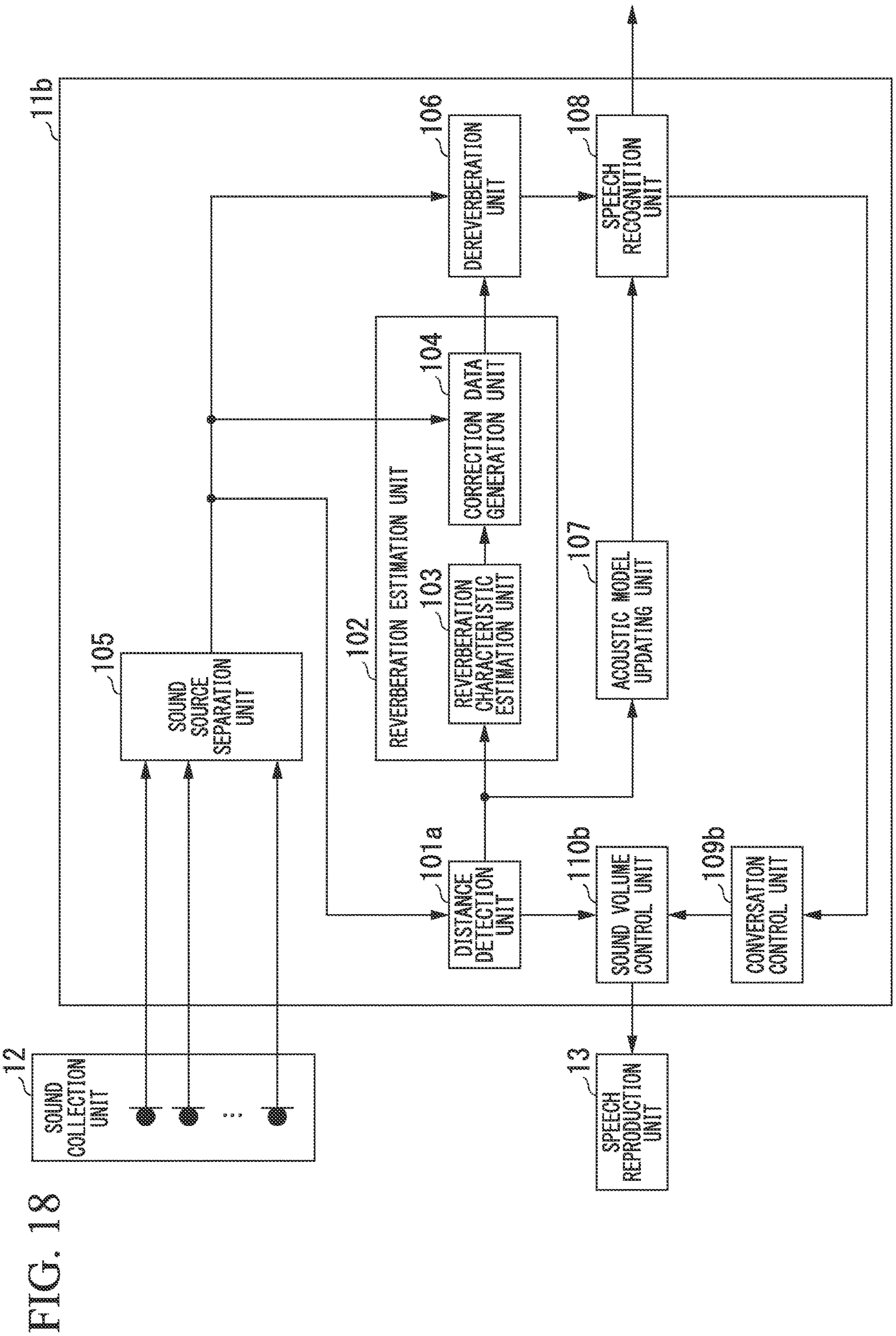
FIG. 18 is a block diagram schematically illustrating a configuration of a speech processing device according to a modification example of the second embodiment.

FIG. 18 is a block diagram schematically illustrating the configuration of a speech processing device 11*b* according to this modification example.

The speech processing device 11*b* includes a conversation control unit 109*b* and a sound volume control unit 110*b* in addition to a distance detection unit 101*a*, a reverberation estimation unit 102, a sound source separation unit 105, a dereverberation unit 106, an acoustic model updating unit 107, and a speech recognition unit 108.

The conversation control unit 109*b* acquires response data corresponding to recognition data input from the speech recognition unit 108, performs an existing text speech combining process on response text indicated by the acquired response data, and generates a speech signal (response speech signal) corresponding to the response text. The conversation control unit 109*b* outputs the generated response speech signal to the sound volume control unit 110*b*. The response data is data in which predetermined recognition data is correlated with response data indicating response text thereto. For example, when a text indicating recognition data is "How are you?", a text indicated by response data is "Fine. Thank you."

Here, the conversation control unit 109*b* includes a storage unit in which sets of predetermined recognition data and response data are stored in correlation and a speech synthesizing unit that synthesizes a speech signal corresponding to a response text indicated by the response data.

The sound volume control unit 110*b* controls the sound volume of the response speech signal input from the conversation control unit 109*b* depending on the distance d' indicated by the distance data input from the distance detection unit 101*a*. The sound volume control unit 110*b* outputs the response speech signal of which the sound volume is controlled to the speech reproduction unit 13. The sound volume control unit 110*b* may control the sound volume, for example, so that the distance d' is proportional to the average amplitude of the response speech signal. When the sound collection unit 12 and the speech reproduction unit β are incorporated or located close to each other, a sound with an almost constant sound volume is presented regardless of the position of the speaking people as a sound source.

The speech reproduction unit β reproduces a sound corresponding to the response speech signal input from the sound volume control unit 110*b*. The speech reproduction unit β is, for example, a speaking person.

A speech processing flow according to this modification example will be described below.

Figure 19:
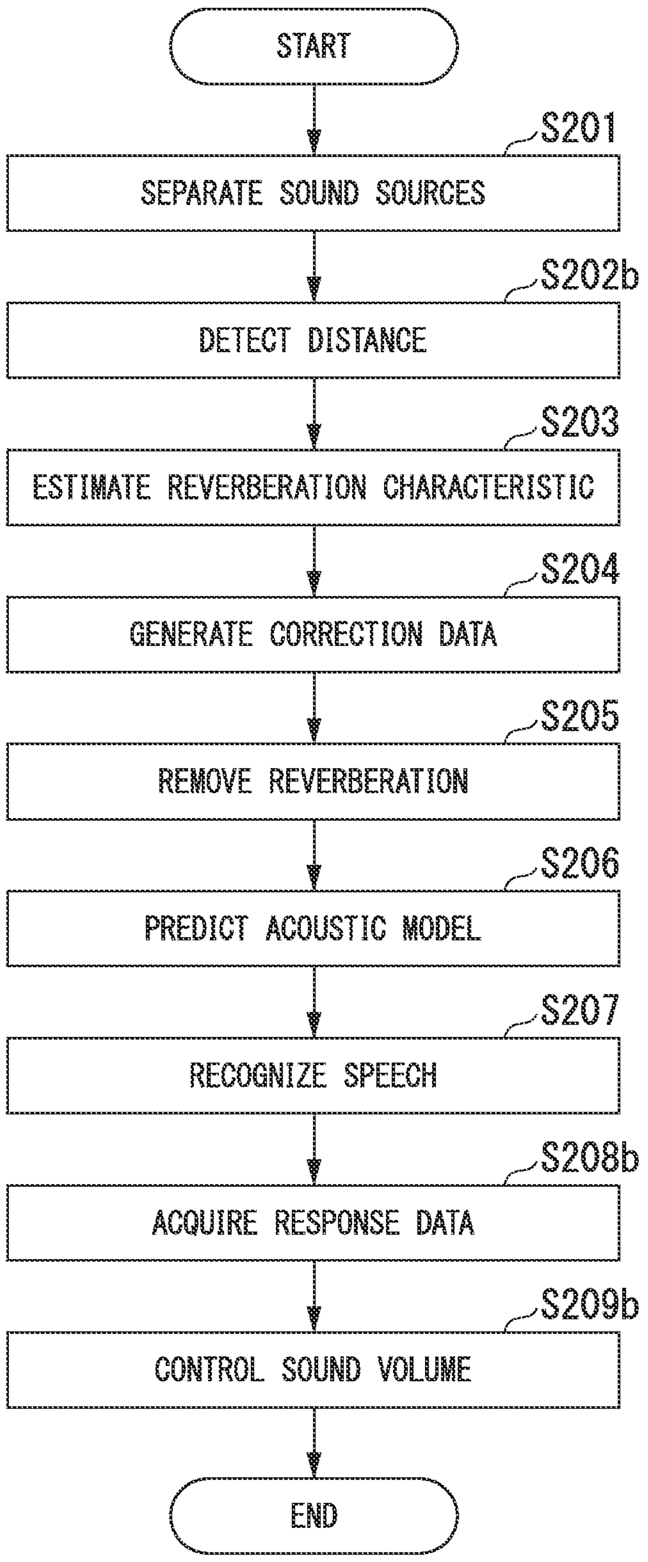
FIG. 19 is a flowchart illustrating a speech processing flow according to the modification example.

FIG. 19 is a flowchart illustrating a speech processing flow according to this modification example.

The speech processing flow according to this modification example includes steps S201 and S203 to S207 (FIG. 5), includes step S202*b* instead of step S202, and further includes steps S208*b* and S209*b*. Step S202*b* is the same process as the distance detecting process illustrated in FIG. 14. After the process of step S207 is performed, the process proceeds to step S208*b*.

(Step S208*b*) The conversation control unit 109*b* acquires response data corresponding to recognition data input from the speech recognition unit 108 and generates a response speech signal by performing an existing text-speech synthesizing process on the response text indicated by the acquired response data. Thereafter, the process proceeds to step S209*b*.

(Step S209*b*) The sound volume control unit 110*b* controls the sound volume of the response speech signal input from the conversation control unit 109*b* and outputs the response speech signal of which the sound volume is controlled to the speech reproduction unit 13.

Thereafter, the process flow illustrated in FIG. 19 ends.

The above-mentioned modifications may be applied to the speech processing device 11 (FIG. 2). That is, the speech processing device 11 may further include the conversation control unit 109*b* and the sound volume control unit 110*b*.

The sound volume control unit 110*b* is not limited to the response speech signal and may control the sound volume of a sound signal (for example, a sound signal received from an opponent communication device and a music sound signal) input from another sound source. In this case, the use of one or both of the speech recognition unit 108 and the conversation control unit 109*b* may be skipped. Accordingly, in the process illustrated in FIG. 19, the use of one or both of steps S207 and S208*b* may be skipped.

The speech recognition unit 108 may control whether to stop the speech recognizing process depending on the detected distance d'. For example, when the detected distance d' is greater than a predetermined distance threshold value (for example, 3 m), the speech recognition unit 108 stops the speech recognizing process. When the detected distance d' is less than the threshold value, the speech recognition unit 108 starts or restarts the speech recognizing process. When the distance d' in a reverberation environment is large, the speech recognition rate decreases but an unnecessary process may be avoided in this case by stopping the speech recognizing process.

In this manner, the distance acquisition unit (for example, the distance detection unit 101*a*) according to this modification example includes acoustic models trained using speech at predetermined distances and selects the distance corresponding to the acoustic model in which the likelihood of the speech is the highest. Accordingly, it is possible to perform various controls such as a sound volume control based on the detected distance d' and a control on whether to stop the speech recognizing process without including hardware for detecting the distance d'.

In the above-mentioned embodiments and modification examples, when the number of microphones N of the sound collection unit 12 is 1, the use of the sound source separation unit 105 may be skipped.

The above-mentioned speech processing devices 11, 11*a*, and 11*b* may be incorporated into the sound collection unit 12. The speech processing device 11*b* may be incorporated into the speech reproduction unit 13.

In the above-mentioned speech processing device 11, as long as the distance data indicating the detected distance d' can be acquired, the use of the distance detection unit 101 may be skipped. The speech processing device 11 may include a distance input unit configured to receive distance data indicating the distance d' detected, for example, by a distance detection unit (not illustrated) that can be mounted on a sound source. The distance input unit and the above-mentioned distance detection units 101 and 101*a* are collectively referred to as a distance acquisition unit.

Parts of the speech processing devices 11, 11*a*, and 11*b* according to the above-mentioned embodiments, for example, the distance detection unit 101*a*, the reverberation estimation unit 102, the sound source separation unit 105, the dereverberation unit 106, the acoustic model updating units 107 and 107*a*, the speech recognition unit 108, the conversation control unit 109*b*, and the sound volume control unit 110*b*, may be embodied by a computer. In this case, the parts of the speech processing devices may be embodied by recording a program for performing the control functions on a computer-readable recording medium and reading and executing the program recorded on the recording medium into a computer system. Here, the "computer system" is a computer system incorporated into the speech processing device 11, 11*a*, and 11*b* and is assumed to include an OS or hardware such as peripherals. Examples of the "computer-readable recording medium" include portable mediums such as a flexible disk, a magneto-optical disk, a ROM, and a CD-ROM and a storage device such as a hard disk built in a computer system. The "computer-readable recording medium" may include a medium that dynamically holds a program for a short time like a communication line when a program is transmitted via a network such as the Internet or a communication circuit such as a telephone circuit or a medium that holds a program for a predetermined time like a volatile memory in a computer system serving as a server or a client in that case. The program may be configured to realize part of the above-mentioned functions or may be configured to realize the above-mentioned functions by combination with a program recorded in advance in a computer system.

All or part of the speech processing device 11, 11*a*, and 11*b* according to the above-mentioned embodiments may be embodied by an integrated circuit such as a large scale integration (LSI) circuit. The functional blocks of the speech processing devices 11, 11*a*, and 11*b* may be individually incorporated into processors, or a part or all thereof may be integrated and incorporated into a processor. The integration circuit technique is not limited to the LSI, but may be embodied by a dedicated circuit or a general-purpose processor. When an integration circuit technique appears as a substituent of the LSI with advancement in semiconductor technology, an integrated circuit based on the technique may be used.

While exemplary embodiments of the invention have been described and illustrated above in detail, the specific configurations are not limited to the above-mentioned configurations but can be modified in design in various forms without departing from the gist of the invention.

What is claimed is:

1. A speech processing device comprising:

a processor; and a sound collection unit configured to record speech from a sound source, a distance detection unit comprising a sensor configured to detect a distance between the sound collection unit and the sound source, the distance detection unit configured to output distance data indicating the detected distance, wherein the processor is configured to acquire, from the distance detection unit, the detected distance between the sound collection unit and the sound source;

measure a reverberation characteristic with respect to a predetermined distance in advance;

estimate a reverberation characteristic with respect to the detected distance based on the detected distance and the measured reverberation characteristic with respect to the predetermined distance;

generate correction data indicating a contribution of a reverberation component from the estimated reverberation characteristic;

remove the reverberation component from the speech by correcting the amplitude of the speech based on the correction data, to produce de-reverbed speech signals in which the reverberation component is removed from the speech; and perform a speech recognizing process on the de-reverbed speech signals to recognize at least one word.

2. The speech processing device according to claim 1, wherein the processor is configured to estimate the reverberation characteristic including a component which is inversely proportional to the distance acquired by the distance detection unit.

3. The speech processing device according to claim 2, wherein the processor is configured to estimate the reverberation characteristic using a coefficient indicating a contribution of the inversely-proportional component determined based on reverberation characteristics measured in advance.

4. The speech processing device according to claim 1, wherein the processor is configured to generate the correction data for each predetermined frequency band, and wherein the processor is configured to correct the amplitude for each frequency band using the correction data of the corresponding frequency band.

5. The speech processing device according to claim 1, wherein the distance detection unit includes an acoustic model trained using speech based on predetermined distances and selects a distance corresponding to the acoustic model having a highest likelihood for the speech.

6. The speech processing device according to claim 1, further comprising:

an acoustic model prediction unit configured to predict an acoustic model corresponding to the distance acquired by the processor from a first acoustic model trained using speech based on the predetermined distances and having a reverberation added thereto and the second acoustic model trained using speech under an environment in which a reverberation is negligible; and a speech recognition unit configured to perform a speech recognizing process using the first acoustic model and the second acoustic model.

7. A speech processing method comprising:

recording, by a sound collection unit, speech from a sound source, detecting, by a distance detection unit comprising a sensor, a distance between the sound collection unit and the sound source, and outputting distance data indicating the detected distance, acquiring, by a processor, the detected distance between the sound collection unit and the sound source;

measuring, by the processor, a reverberation characteristic with respect to a predetermined distance in advance;

estimating, by the processor, a reverberation characteristic with respect to the detected distance based on the detected distance and the measured reverberation characteristic with respect to the predetermined distance;

generating, by the processor, correction data indicating a contribution of a reverberation component from the estimated reverberation characteristic;

removing, by the processor, the reverberation component from the speech by correcting the amplitude of the speech based on the correction data, to produce de-reverbed speech signals in which the reverberation component is removed from the speech; and performing, by the processor, a speech recognizing process on the de-reverbed speech signals to recognize at least one word.

8. A non-transitory computer-readable storage medium comprising a speech processing program causing a computer of a speech processing device to perform:

a speech recording process of recording speech from a sound source, a distance detecting process of detecting a distance between a sound collection unit configured to record speech from the sound source and the sound source, and outputting distance data indicating the detected distance, a distance acquiring process of acquiring the detected distance between the sound collection unit and the sound source;

a reverberation characteristic measuring process of measuring a reverberation characteristic with respect to a predetermined distance in advance;

a reverberation characteristic estimating process of estimating a reverberation characteristic with respect to the detected distance based on the detected distance and the measured reverberation characteristic with respect to the predetermined distance;

a correction data generating process of generating correction data indicating a contribution of a reverberation component from the estimated reverberation characteristic;

a dereverbing process of removing the reverberation component from the speech by correcting the amplitude of the speech based on the correction data, to produce de-reverbed speech signals in which the reverberation component is removed from the speech; and a speech recognizing process of performing speech recognition on the de-reverbed speech signals to recognize at least one word.

* * * * *